US012207076B2

(12) United States Patent
Ramachandra et al.

(10) Patent No.: US 12,207,076 B2
(45) Date of Patent: Jan. 21, 2025

(54) METHODS FOR SORTING NEIGHBOR CELLS IN RADIO LINK FAILURE (RLF) REPORT

(71) Applicant: Telefonaktiebolaget LM Ericsson (PUBL), Stockholm (SE)

(72) Inventors: Pradeepa Ramachandra, Linköping (SE); Ali Parichehrehteroujeni, Linköping (SE); Kristina Zetterberg, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 326 days.

(21) Appl. No.: 17/772,069

(22) PCT Filed: Oct. 8, 2020

(86) PCT No.: PCT/SE2020/050964
§ 371 (c)(1),
(2) Date: Apr. 26, 2022

(87) PCT Pub. No.: WO2021/086245
PCT Pub. Date: May 6, 2021

(65) Prior Publication Data
US 2022/0345964 A1 Oct. 27, 2022

Related U.S. Application Data

(60) Provisional application No. 62/928,840, filed on Oct. 31, 2019.

(51) Int. Cl.
*H04W 36/30* (2009.01)
*H04W 36/00* (2009.01)
*H04W 24/10* (2009.01)

(52) U.S. Cl.
CPC ..... *H04W 36/305* (2018.08); *H04W 36/0058* (2018.08); *H04W 24/10* (2013.01)

(58) Field of Classification Search
CPC ....... H04W 36/00835; H04W 36/0058; H04W 36/305; H04W 24/10; H04W 24/04
(Continued)

(56) References Cited

FOREIGN PATENT DOCUMENTS

| CN | 103181209 A | 6/2013 |
|---|---|---|
| CN | 107959984 A | 4/2018 |

(Continued)

OTHER PUBLICATIONS

3GPP TSG-RAN2 Meeting #107 R2-1910848 Prague, Czech Republic, Aug. 26-30, 2019 (Year: 2019).*

(Continued)

*Primary Examiner* — Tanmay K Shah
(74) *Attorney, Agent, or Firm* — Baker Botts L.L.P.

(57) ABSTRACT

Embodiments include methods, performed by a user equipment (UE), for reporting radio link failure (RLF) in a cell of a wireless network. Such methods include performing measurements of a plurality of cells, which can include a serving cell and multiple neighbor cells. The measurements for each cell are based on one or more types of reference signals (RS) transmitted in the particular cell and include one or more measurement quantities. Such methods include determining that an RLF occurred in the serving cell and sorting the neighbor cell measurements into one or more measurement lists based on one or more sorting criteria, which can be related to the RS types on which the measurements for the respective neighbor cells are based and/or the measurement quantities available for the respective neighbor cells. Such methods include transmitting, to a network node, an RLF report including the one or more measurement lists.

20 Claims, 15 Drawing Sheets

(58) Field of Classification Search
USPC .......................................................... 455/437
See application file for complete search history.

(56) References Cited

FOREIGN PATENT DOCUMENTS

| JP | 2020-533854 A2 | 11/2020 |
|---|---|---|
| KR | 10-2012-0118508 A | 10/2012 |
| WO | 2012 111260 A1 | 8/2012 |

OTHER PUBLICATIONS

ETSI TS 136 213 v15.7.0; LTE; Evolved Universal Terrestrial Radio Access (E-UTRA); Physical layer procedures (3GPP TS 36.213 version 15.7.0 Release 15)—Oct. 2019.
3GPP TS 36.321 v15.7.0; 3rd Generation Partnership Project; Technical Specification group Radio Access Network; Evolved Universal Terrestrial Radio Access (E-UTRA); Medium Access Control (MAC) protocol specification (Release 15)—Sep. 2019.
3GPP TS 36.331 v15.7.0; 3rd Generation Partnership Project; Technical Specification Group Radio Access Network; Evolved Universal Terrestrial Radio Access (E-UTRA); Radio Resource Control (RRC); Protocol specification (Release 15)—Sep. 2019.
3GPP TS 36.423 v15.7.0; 3rd Generation Partnership Project; Technical Specification Group Radio Access Network; Evolved Universal Terrestrial Radio Access Network (E-UTRAN); X2 application protocol (X2AP) (Release 15)—Sep. 2019.
3GPP TSG RAN WG2 Meeting #101bis; Sanya, China; Source: Mediatek Inc.; Title: RLF Report in NR (R2-1804612)—Apr. 16-20, 2018.
3GPP TSG-RAN WG2 #103; Gothenburg, Sweden; Source: Samsung Electronics; Title: Introduction of RLF report in SA (R2-1812698)—Aug. 20-24, 2018.
3GPP TSG-RAN WG2 Meeting #107; Prague, Czech Republic; Source: CMCC; Title: Discussion on the RLF Report (R2-1909762)—Aug. 26-30, 2019.
3GPP TSG-RAN2 Meeting #107; Prague, Czech Republic; Change Request; Title: RLF report contents in NR; Source to WG: Ericsson; Source to TSG: R2 (R2-1910848)—Aug. 26-30, 2019.
3GPP TSG-RAN WG2 #108; Reno, USA; Source: Ericsson; Title: Open issues related to the RLF report (R2-1915434)—Nov. 18-22, 2019.
PCT International Search Report issued for International application No. PCT/SE2020/050964—Dec. 21, 2020.
PCT Written Opinion of the International Searching Authority issued for International application No. PCT/SE2020/050964—Dec. 21, 2020.
Notification of Reasons for Refusal issued for Japanese Patent Application 2022-522727—Jun. 9, 2023.
3GPP TSG-RAN WG2 Meeting #107bis; Chongqing, China, Oct. 14-18, 2019; Source: ZTE Corporation, Sanechips; Title: Discussion on RLF & CEF report; Agenda item: 6.12.4 (R2-1913077 (revision of R2-1909802)).
Office Action issued for Japanese Application No. 2022-522727—Oct. 30, 2023.
3GPP TSG-RAN WG2 #103; Gothenburg, Sweden, Aug. 20-24, 2018; Agenda Item: 10.4.1.3.10; Source: Samsung Electronics; Title: Introduction of RLF report in SA (R2-1812698).
Office Action issued for Chinese Patent Application No. 202210584464.6—Aug. 12, 2024.
Search Report issued for Chinese Patent Application No. 2022105844646—Aug. 9, 2024.

* cited by examiner

```
-- ASN1START
RLF-TimersAndConstants-r9 ::=      CHOICE {
    release                            NULL,
    setup                              SEQUENCE {
        t301-r9                            ENUMERATED {ms100, ms200, ms300, ms400, ms600, ms1000, ms1500, ms2000},
        t310-r9                            ENUMERATED {ms0, ms50, ms100, ms200, ms500, ms1000, ms2000},
        n310-r9                            ENUMERATED {n1, n2, n3, n4, n6, n8, n10, n20},
        t311-r9                            ENUMERATED {ms1000, ms3000, ms5000, ms10000, ms15000, ms20000, ms30000},
        n311-r9                            ENUMERATED {n1, n2, n3, n4, n5, n6, n8, n10},
        ...
    }
}

RLF-TimersAndConstants-r13 ::=     CHOICE {
    release                            NULL,
    setup                              SEQUENCE {
        t301-v1310                         ENUMERATED {ms2500, ms3000, ms3500, ms4000, ms5000, ms6000, ms8000, ms10000},
        ...,
        [[ t310-v1330                      ENUMERATED {ms4000, ms6000} OPTIONAL     -- Need ON
        ]]
    }
}

RLF-TimersAndConstantsSCG-r12 ::=  CHOICE {
    release                            NULL,
    setup                              SEQUENCE {
        t313-r12                           ENUMERATED {ms0, ms50, ms100, ms200, ms500, ms1000, ms2000},
        n313-r12                           ENUMERATED {n1, n2, n3, n4, n6, n8, n10, n20},
        n314-r12                           ENUMERATED {n1, n2, n3, n4, n5, n6, n8, n10},
        ...
    }
}
-- ASN1STOP
```

FIG. 6

```
-- ASN1START

RACH-ConfigCommon ::=       SEQUENCE {
    preambleInfo                 SEQUENCE {
        numberOfRA-Preambles         ENUMERATED {n4, n8, n12, n16, n20, n24, n28, n32, n36, n40, n44, n48, n52,
                                                 n56, n60, n64},
        preamblesGroupAConfig        SEQUENCE {
            sizeOfRA-PreamblesGroupA     ENUMERATED {n4, n8, n12, n16, n20, n24, n28, n32, n36, n40, n44, n48,
                                                     n52, n56, n60},
            messageSizeGroupA            ENUMERATED {b56, b144, b208, b256},
            messagePowerOffsetGroupB     ENUMERATED {minusinfinity, dB0, dB5, dB8, dB10, dB12, dB15, dB18},
            ...                                                                  -- Need OP
        }                            OPTIONAL
    },
    powerRampingParameters       PowerRampingParameters,
    ra-SupervisionInfo           SEQUENCE {
        preambleTransMax             PreambleTransMax,
        ra-ResponseWindowSize        ENUMERATED {sf2, sf3, sf4, sf5, sf6, sf7, sf8, sf10},
        mac-ContentionResolutionTimer ENUMERATED {sf8, sf16, sf24, sf32, sf40, sf48, sf56, sf64}
    }
}

PreambleTransMax ::=       ENUMERATED {n3, n4, n5, n6, n7, n8, n10, n20, n50, n100, n200}
```

FIG. 9

```
-- ASN1START

UEInformationRequest-r9 ::=         SEQUENCE {
    rrc-TransactionIdentifier       RRC-TransactionIdentifier,
    criticalExtensions              CHOICE {
        c1                          CHOICE {
            ueInformationRequest-r9     UEInformationRequest-r9-IEs,
            spare3 NULL, spare2 NULL, spare1 NULL
        },
        criticalExtensionsFuture    SEQUENCE {}
    }
}

UEInformationRequest-r9-IEs ::=     SEQUENCE {
    rach-ReportReq-r9               BOOLEAN,
    rlf-ReportReq-r9                BOOLEAN,
    nonCriticalExtension            UEInformationRequest-v930-IEs       OPTIONAL
}

UEInformationRequest-v930-IEs ::=   SEQUENCE {
    lateNonCriticalExtension        OCTET STRING                        OPTIONAL,
    nonCriticalExtension            UEInformationRequest-v1020-IEs      OPTIONAL
}

UEInformationRequest-v1020-IEs ::=  SEQUENCE {
    logMeasReportReq-r10            ENUMERATED {true}                   OPTIONAL,    -- Need ON
    nonCriticalExtension            UEInformationRequest-v1130-IEs      OPTIONAL
}

UEInformationRequest-v1130-IEs ::=  SEQUENCE {
    connEstFailReportReq-r11        ENUMERATED {true}                   OPTIONAL,    -- Need ON
    nonCriticalExtension            UEInformationRequest-v1250-IEs      OPTIONAL
}

UEInformationRequest-v1250-IEs ::=  SEQUENCE {
    mobilityHistoryReportReq-r12    ENUMERATED {true}                   OPTIONAL,    -- Need ON
    nonCriticalExtension            UEInformationRequest-v1530-IEs      OPTIONAL
}

UEInformationRequest-v1530-IEs ::=  SEQUENCE {
    idleModeMeasurementReq-r15      ENUMERATED {true}                   OPTIONAL,    -- Need ON
    flightPathInfoReq-r15           FlightPathInfoReportConfig-r15      OPTIONAL,    -- Need ON
    nonCriticalExtension            SEQUENCE {}                         OPTIONAL
}

-- ASN1STOP
```

FIG. 10

```
-- ASN1START
UEInformationResponse-r9 ::=          SEQUENCE {
    rrc-TransactionIdentifier         RRC-TransactionIdentifier,
    criticalExtensions                CHOICE {
        c1                                CHOICE {
            ueInformationResponse-r9          UEInformationResponse-r9-IEs,
            spare3 NULL, spare2 NULL, spare1 NULL
        },
        criticalExtensionsFuture          SEQUENCE {}
    }
}
UEInformationResponse-r9-IEs ::=      SEQUENCE {
    rach-Report-r9                    SEQUENCE {
        numberOfPreamblesSent-r9          NumberOfPreamblesSent-r11,
        contentionDetected-r9             BOOLEAN
    }                                                                     OPTIONAL,
    rlf-Report-r9                     RLF-Report-r9                       OPTIONAL,
    nonCriticalExtension              UEInformationResponse-v930-IEs      OPTIONAL
}
-- Late non critical extensions
UEInformationResponse-v9e0-IEs ::=    SEQUENCE {
    rlf-Report-v9e0                   RLF-Report-v9e0                     OPTIONAL,
    nonCriticalExtension              SEQUENCE {}                         OPTIONAL
}
-- Regular non critical extensions
UEInformationResponse-v930-IEs ::=    SEQUENCE {
    lateNonCriticalExtension          OCTET STRING (CONTAINING
                                          UEInformationResponse-v9e0-IEs) OPTIONAL,
    nonCriticalExtension              UEInformationResponse-v1020-IEs     OPTIONAL
}

UEInformationResponse-v1020-IEs ::=   SEQUENCE {
    logMeasReport-r10                 LogMeasReport-r10                   OPTIONAL,
    nonCriticalExtension              UEInformationResponse-v1130-IEs     OPTIONAL
}

UEInformationResponse-v1130-IEs ::=   SEQUENCE {
    connEstFailReport-r11             ConnEstFailReport-r11               OPTIONAL,
    nonCriticalExtension              UEInformationResponse-v1250-IEs     OPTIONAL
}

UEInformationResponse-v1250-IEs ::=   SEQUENCE {
    mobilityHistoryReport-r12         MobilityHistoryReport-r12           OPTIONAL,
    nonCriticalExtension              UEInformationResponse-v1530-IEs     OPTIONAL
}

UEInformationResponse-v1530-IEs ::=   SEQUENCE {
    measResultListIdle-r15            MeasResultListIdle-r15              OPTIONAL,
    flightPathInfoReport-r15          FlightPathInfoReport-r15            OPTIONAL,
    nonCriticalExtension              SEQUENCE {}                         OPTIONAL
}
```

FIG. 11A

```
RLF-Report-r9 ::=                   SEQUENCE {
    measResultLastServCell-r9           SEQUENCE {
        rsrpResult-r9                       RSRP-Range,
        rsrqResult-r9                       RSRQ-Range              OPTIONAL
    },
    measResultNeighCells-r9             SEQUENCE {
        measResultListEUTRA-r9              MeasResultList2EUTRA-r9     OPTIONAL,
        measResultListUTRA-r9           MeasResultList2UTRA-r9          OPTIONAL,
        measResultListGERAN-r9              MeasResultListGERAN         OPTIONAL,
        measResultsCDMA2000-r9              MeasResultList2CDMA2000-r9  OPTIONAL
    } OPTIONAL,
    ...,
    [[ locationInfo-r10             LocationInfo-r10            OPTIONAL,
       failedPCellId-r10                CHOICE {
           cellGlobalId-r10                 CellGlobalIdEUTRA,
           pci-arfcn-r10                    SEQUENCE {
               physCellId-r10                   PhysCellId,
               carrierFreq-r10                      ARFCN-ValueEUTRA
           }
       }                                                    OPTIONAL,
       reestablishmentCellId-r10        CellGlobalIdEUTRA           OPTIONAL,
       timeConnFailure-r10              INTEGER (0..1023)           OPTIONAL,
       connectionFailureType-r10        ENUMERATED {rlf, hof}       OPTIONAL,
       previousPCellId-r10              CellGlobalIdEUTRA           OPTIONAL
    ]],
    [[ failedPCellId-v1090               SEQUENCE {
           carrierFreq-v1090                ARFCN-ValueEUTRA-v9e0
       }                                                    OPTIONAL
    ]],
    [[ basicFields-r11                   SEQUENCE {
           c-RNTI-r11                       C-RNTI,
           rlf-Cause-r11                    ENUMERATED {
                                                t310-Expiry, randomAccessProblem,
                                                rlc-MaxNumRetx, t312-Expiry-r12},
           timeSinceFailure-r11             TimeSinceFailure-r11
       }                                                    OPTIONAL,
       previousUTRA-CellId-r11          SEQUENCE {
           carrierFreq-r11                  ARFCN-ValueUTRA,
           physCellId-r11                   CHOICE {
               fdd-r11                          PhysCellIdUTRA-FDD,
               tdd-r11                          PhysCellIdUTRA-TDD
           },
           cellGlobalId-r11                 CellGlobalIdUTRA            OPTIONAL
       }                                                    OPTIONAL,
       selectedUTRA-CellId-r11          SEQUENCE {
           carrierFreq-r11                  ARFCN-ValueUTRA,
           physCellId-r11                   CHOICE {
               fdd-r11                          PhysCellIdUTRA-FDD,
               tdd-r11                          PhysCellIdUTRA-TDD
           }
       }                                                    OPTIONAL
    ]],
    [[ failedPCellId-v1250               SEQUENCE {
           tac-FailedPCell-r12              TrackingAreaCode
       }                                                    OPTIONAL,
       measResultLastServCell-v1250 RSRQ-Range-v1250             OPTIONAL,
       lastServCellRSRQ-Type-r12        RSRQ-Type-r12               OPTIONAL,
       measResultListEUTRA-v1250        MeasResultList2EUTRA-v1250  OPTIONAL
    ]],
    [[ drb-EstablishedWithQCI-1-r13      ENUMERATED {qci1}           OPTIONAL
    ]],
    [[ measResultLastServCell-v1360      RSRP-Range-v1360            OPTIONAL
    ]],
    [[ logMeasResultListBT-r15           LogMeasResultListBT-r15     OPTIONAL,
       logMeasResultListWLAN-r15        LogMeasResultListWLAN-r15   OPTIONAL
    ]]
}
```

FIG. 11B

```
PLF-Report-v9e0 ::=              SEQUENCE {
    measResultListEUTRA-v9e0         MeasResultList2EUTRA-v9e0
}
MeasResultList2EUTRA-r9 ::=      SEQUENCE (SIZE (1..maxFreq)) OF MeasResult2EUTRA-r9
MeasResultList2EUTRA-v9e0 ::=    SEQUENCE (SIZE (1..maxFreq)) OF MeasResult2EUTRA-v9e0
MeasResultList2EUTRA-v1250 ::=   SEQUENCE (SIZE (1..maxFreq)) OF MeasResult2EUTRA-v1250
MeasResult2EUTRA-r9 ::=          SEQUENCE {
    carrierFreq-r9                   ARFCN-ValueEUTRA,
    measResultList-r9                MeasResultListEUTRA
}
MeasResult2EUTRA-v9e0 ::=        SEQUENCE {
    carrierFreq-v9e0                 ARFCN-ValueEUTRA-v9e0          OPTIONAL
}
MeasResult2EUTRA-v1250 ::=       SEQUENCE {
    rsrq-Type-r12                    RSRQ-Type-r12                  OPTIONAL
}
MeasResultList2UTRA-r9 ::=       SEQUENCE (SIZE (1..maxFreq)) OF MeasResult2UTRA-r9
MeasResult2UTRA-r9 ::=           SEQUENCE {
    carrierFreq-r9                   ARFCN-ValueUTRA,
    measResultList-r9                MeasResultListUTRA
}
MeasResultList2CDMA2000-r9 ::=   SEQUENCE (SIZE (1..maxFreq)) OF MeasResult2CDMA2000-r9
MeasResult2CDMA2000-r9 ::=       SEQUENCE {
    carrierFreq-r9                   CarrierFreqCDMA2000,
    measResultList-r9                MeasResultsCDMA2000
}
...
ConnEstFailReport-r11 ::=        SEQUENCE {
    failedCellId-r11                 CellGlobalIdEUTRA,
    locationInfo-r11                 LocationInfo-r10               OPTIONAL,
    measResultFailedCell-r11         SEQUENCE {
        rsrpResult-r11                   RSRP-Range,
        rsrqResult-r11                   RSRQ-Range                 OPTIONAL
    },
    measResultNeighCells-r11         SEQUENCE {
        measResultListEUTRA-r11          MeasResultList2EUTRA-r9    OPTIONAL,
        measResultListUTRA-r11           MeasResultList2UTRA-r9     OPTIONAL,
        measResultListGERAN-r11          MeasResultListGERAN        OPTIONAL,
        measResultsCDMA2000-r11          MeasResultList2CDMA2000-r9 OPTIONAL
    } OPTIONAL,
    numberOfPreamblesSent-r11        NumberOfPreamblesSent-r11,
    contentionDetected-r11           BOOLEAN,
    maxTxPowerReached-r11            BOOLEAN,
    timeSinceFailure-r11             TimeSinceFailure-r11,
    measResultListEUTRA-v1130        MeasResultList2EUTRA-v9e0      OPTIONAL,
    ...,
    [[ measResultFailedCell-v1250    RSRQ-Range-v1250               OPTIONAL,
       failedCellRSRQ-Type-r12       RSRQ-Type-r12                  OPTIONAL,
       measResultListEUTRA-v1250     MeasResultList2EUTRA-v1250     OPTIONAL
    ]],
    [[ measResultFailedCell-v1360    RSRP-Range-v1360               OPTIONAL
    ]],
    [[ logMeasResultListBT-r15       LogMeasResultListBT-r15        OPTIONAL,
       logMeasResultListWLAN-r15     LogMeasResultListWLAN-r15      OPTIONAL
    ]]
}

NumberOfPreamblesSent-r11::=     INTEGER (1..200)
TimeSinceFailure-r11 ::=         INTEGER (0..172800)
MobilityHistoryReport-r12 ::=    VisitedCellInfoList-r12

FlightPathInfoReport-r15 ::=     SEQUENCE {
    flightPath-r15                   SEQUENCE (SIZE (1..maxWayPoint-r15)) OF
                                             WayPointLocation-r15   OPTIONAL,
    nonCriticalExtension             SEQUENCE {}                    OPTIONAL
}

WayPointLocation-r15 ::=         SEQUENCE {
    wayPointLocation-r15                 LocationInfo-r10,
    timeStamp-r15                        AbsoluteTimeInfo-r10       OPTIONAL
}
-- ASN1STOP
```

FIG. 11C

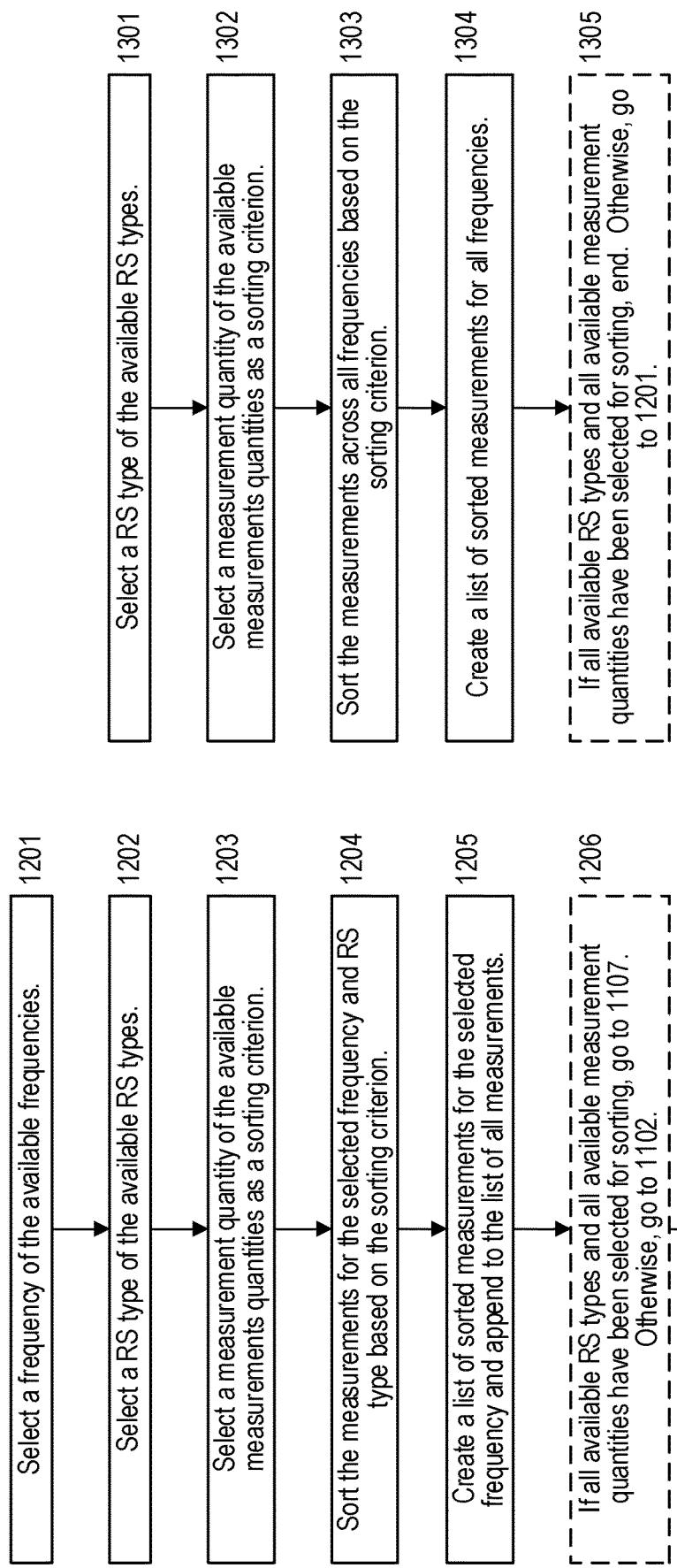

METHODS FOR SORTING NEIGHBOR CELLS IN RADIO LINK FAILURE (RLF) REPORT

PRIORITY

This nonprovisional application is a U.S. National Stage Filing under 35 U.S.C. § 371 of International Patent Application Serial No. PCT/SE2020/050964 filed Oct. 8, 2020 and entitled "Methods For Sorting Neighbor Cells in Radio Link Failure (RLF) Report" which claims priority to U.S. Provisional Patent Application No. 62/928,840 filed Oct. 31, 2019 both of which are hereby incorporated by reference in their entirety.

TECHNICAL FIELD

The present invention generally relates to wireless communication networks, and particularly relates to improvements in the mobility of user equipment (UEs) upon experiencing a radio link failure (RLF) in a current serving cell in such networks.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. Besides the typical mobile broadband use case, also machine type communication (MTC), ultra-low latency critical communications (URLCC), side-link device-to-device (D2D), and several other use cases too. The present disclosure relates generally to both NR and previous-generation Long-Term Evolution (LTE) technology, which is described immediately below.

Long Term Evolution (LTE) is an umbrella term for so-called fourth generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Rel-10 supports bandwidths larger than 20 MHz. One important requirement on Rel-10 is to backward compatibility with LTE Rel-8. This also includes spectrum compatibility in which a wideband LTE Rel-10 carrier (e.g., wider than 20 MHz) should appear as multiple carriers to an LTE Rel-8 ("legacy") terminal ("user equipment" or UE). Each such carrier can be referred to as a Component Carrier (CC). For efficient usage, legacy terminals can be scheduled in all parts of the wideband LTE Rel-10 carrier. This can be done by Carrier Aggregation (CA), in which a Rel-10 terminal receives multiple CCs, each having the same structure as a Rel-8 carrier. LTE Rel-12 introduced dual connectivity (DC) whereby a UE can be connected to two network nodes simultaneously, thereby improving connection robustness and/or capacity.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs (e.g., UE 120) in uplink and downlink, as well as security of the communications with UEs. These functions reside in the eNBs, such as eNBs 105, 110, and 115. Each of the eNBs can serve a geographic coverage area including one more cells, such as cells 106, 111, and 116 served by eNBs 105, 110, and 115, respectively.

The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The SGW handles all Internet Protocol (IP) data packets (e.g., data or user plane) between the UE and the EPC and serves as the local mobility anchor for the data bearers when UE 120 moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)-labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

FIG. 2B illustrates a block diagram of an exemplary Control (C)-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel on PDCCH for pages from the EPC via eNB. A UE in RRC_IDLE state is known in the EPC and has an assigned IP address, but is not known to the serving eNB (e.g., there is no stored context).

Logical channel communications between a UE and an eNB are via radio bearers. Since LTE Rel-8, signaling radio bearers (SRBs) SRB0, SRB1, and SRB2 have been available for the transport of RRC and NAS messages. SRB0 is used for RRC connection setup, RRC connection resume, and RRC connection re-establishment. Once any of these operations has succeeded, SRB1 is used for handling RRC messages (which may include a piggybacked NAS message) and for NAS messages prior to establishment of SRB2. SRB2 is used for NAS messages and lower-priority RRC messages (e.g., logged measurement information). SRB0 and SRB1 are also used for establishment and modification of data radio bearers (DRBs) for carrying user data between the UE and eNB.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3 shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth.

As shown in FIG. 3, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz subcarrier bandwidth) or 24 (7.5-kHz bandwidth).

An exemplary LTE FDD uplink (UL) radio frame can be arranged in a manner similar to the exemplary FDD DL radio frame shown in FIG. 3. Using terminology consistent with the above DL description, each UL slot consists of $N^{UL}_{symb}$ OFDM symbols, each of which is comprised of $N_c$ OFDM subcarriers.

In general, an LTE physical channel corresponds to a set of REs carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals (e.g., channel state information reference signals, CSI-RS), synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI) including scheduling information for DL messages on PDSCH, grants for UL transmission on PUSCH, and channel quality feedback (e.g., CSI) for the UL channel. PHICH carries HARQ feedback (e.g., ACK/NAK) for UL transmissions by the UEs.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PUSCH is the uplink counterpart to the PDSCH. PUCCH is used by UEs to transmit uplink control information (UCI) including HARQ feedback for eNB DL transmissions, channel quality feedback (e.g., CSI) for the DL channel, scheduling requests (SRs), etc. PRACH is used for random access preamble transmission.

Within the LTE DL, certain REs within each LTE subframe are reserved for the transmission of reference signals, such as DM-RS mentioned above. Other DL reference signals include cell-specific reference signals (CRS), positioning reference signals (PRS), and CSI reference signals (CSI-RS). UL reference signals include DM-RS and SRS mentioned above.

Other RS-like DL signals include Primary Synchronization Sequence (PSS) and Secondary Synchronization Sequence (SSS), which facilitate the UEs time and frequency synchronization and acquisition of system parameters (e.g., via PBCH).

In LTE, UL and DL data transmissions (e.g., on PUSCH and PDSCH, respectively) can take place with or without an explicit grant or assignment of resources by the network (e.g., eNB). In general, UL transmissions are usually referred to as being "granted" by the network (i.e., "UL grant"), while DL transmissions are usually referred to as taking place on resources that are "assigned" by the network (i.e., "DL assignment"). In case of a transmission based on an explicit grant/assignment, downlink control information (DCI) is sent to the UE informing it of specific radio resources to be used for the transmission. In contrast, a transmission without an explicit grant/assignment is typically configured to occur with a defined periodicity. Given a periodic and/or recurring UL grant and/or DL assignment, the UE can then initiate a data transmission and/or receive data according to a predefined configuration. Such transmissions can be referred to as semi-persistent scheduling (SPS), configured grant (CG), or grant-free transmissions.

Seamless mobility is a key feature of 3GPP radio access technologies (RATs). In general, a network configures a UE to perform and report radio resource management (RRM) measurements to assist network-controlled mobility decisions, such as for handover from a serving cell to a neighbor cell. Seamless handovers ensure that the UE moves around in the coverage area of different cells without causing too many interruptions in data transmission. However, there will be scenarios when the network fails to handover the UE to the "correct" neighbor cell in time, which can cause the UE will declare radio link failure (RLF) or handover failure (HOF).

An RLF reporting procedure was introduced as part of the mobility robustness optimization (MRO) in LTE Rel-9. In this procedure, a UE logs relevant information at the time of RLF and later reports such information to the network via a target cell to which the UE ultimately connects (e.g., after reestablishment). The reported information can include RRM measurements of various neighbor cells prior to the mobility operation (e.g., handover). Even so, how the UE sorts, orders, and/or prioritizes such neighbor cell measurements in the report is undefined. This can cause ambiguity, uncertainty, and/or confusion in how the network interprets such measurements in UE RLF reports.

SUMMARY

Embodiments of the present disclosure provide specific improvements to handling of RLFs by UEs in a wireless network, such as by facilitating solutions to overcome the exemplary problems summarized above and described in more detail below.

Embodiments of the present disclosure include methods (e.g., procedures) for reporting radio link failure (RLF) in a cell of a wireless network. These exemplary methods can be performed by a user equipment (UE, e.g., wireless device, MTC device, NB-IoT device, modem, etc. or component thereof) operating in a wireless network (e.g., E-UTRAN, NG-RAN, etc.) comprising a plurality of cells.

These exemplary methods can include perform measurements of a plurality of cells in the wireless network. The plurality of cells can include a serving cell (i.e., for the UE) and a plurality of neighbor cells. The measurements for each particular cell are based on one or more types of reference signals (RS) transmitted in the particular cell. For example, the types of RS can include any of the following: cell-specific RS (CRS), channel state information RS (CSI-RS), and synchronization/PBCH signal block (SSB). In addition, the measurements performed by the UE on each cell can include one or more measurement quantities. For example, the one or more measurement quantities can include any of the following: reference signal received power (RSRP), reference signal received quality (RSRQ), and signal-to-inference-and-noise ratio (SINR).

These exemplary methods can also include determining that a radio link failure (RLF) occurred in the serving cell. These exemplary methods can also include sorting the neighbor cell measurements into one or more measurement lists based on one or more sorting criteria. The sorting criteria can be related to one or more of the following: the RS types on which the measurements, for the respective neighbor cells, are based; and the measurement quantities available for the respective neighbor cells. These exemplary methods can also include transmitting, to a network node, an RLF report including the one or more measurement lists (e.g., as sorted).

In some embodiments, the sorting criteria can include a particular measurement quantity (e.g., RSRP, RSRQ, or SINR). In such embodiments, the sorting operations can include ordering the neighbor cell measurements into the one or more measurement lists based on values of the particular measurement quantity measured for the respective neighbor cells.

In some of these embodiments, the sorting criteria can include a plurality of measurement quantities and the one or more measurements lists can include a plurality of measurement lists associated with the respective measurement quantities. In such embodiments, the neighbor cell measurements that include the respective measurement quantities can be ordered into the respective measurement lists.

In other of these embodiments, the sorting criteria can also include a particular RS type. In such embodiments, ordering the neighbor cell measurements into the one or more measurement lists can be based on values of the particular measurement quantity measured for the respective neighbor cells based on the particular RS type. For example, when values of the particular measurement quantity are equal for two of the neighbor cells, ordering the measurements for the two neighbor cells can be based on values of one of the following measured for the two neighbor cells:
  a further measurement quantity based on the particular RS type; or
  the particular measurement quantity based on a further RS type.

In other of these embodiments, the sorting criteria can also include a plurality of RS types and the one or more measurements lists include a plurality of measurement lists associated with the respective plurality of RS types. In such embodiments, ordering the neighbor cell measurements into the one or more measurement lists can be based on values of the particular measurement quantity measured for the respective neighbor cells based on the respective RS types.

In some embodiments, the neighbor cell measurements can be performed on a plurality of carrier frequencies. In some of these embodiments, the one or more measurements lists include a plurality of measurement lists associated with the respective plurality of carrier frequencies, and the neighbor cell measurements made on the respective carrier frequencies are ordered into the respective measurement lists.

In other of these embodiments, the one or more measurement lists are associated with the plurality of carrier frequencies, such that neighbor cell measurements made on all of the carrier frequencies are ordered into the one or more measurement lists. In some of these embodiments, the one or more measurements lists include a plurality of measurement lists associated with a respective plurality of RS types and with all of the carrier frequencies. In such embodiments, the neighbor cell measurements made on the respective RS types are ordered into the respective measurement lists.

In some embodiments, the one or more measurements lists can include a plurality of measurement lists. In such embodiments, the sorting operations can include combining the plurality of measurement lists into a single measurement list according to priority orders of one or more of the following associated with the respective measurement lists: carrier frequencies, RS types, and measurement quantities. In such embodiments, the RLF report can include the single measurement list.

In various embodiments, the one or more measurement lists (e.g., included in the RLF report) can include one of the following types of measurement values:
- values of a particular measurement quantity, used as a sorting criterion, that are based on a particular RS type, also used as a sorting criterion;
- values of a particular measurement quantity, used as a sorting criterion, that are based on any of the RS types;
- values of any available measurement quantities that are based on a particular RS type used as a sorting criterion; or
- values of any available measurement quantities that are based on any of the RS types.

Other embodiments include user equipment (UEs, e.g., wireless devices, MTC devices, NB-IoT devices, or components thereof, such as a modem) configured to perform operations corresponding to any of the exemplary methods described herein. Other embodiments include non-transitory, computer-readable media storing program instructions that, when executed by processing circuitry, configure such UEs to perform operations corresponding to the exemplary methods described herein.

These and other objects, features, benefits, and advantages of embodiments of the present disclosure will become apparent upon reading the following Detailed Description in view of the Drawings briefly described below.

BRIEF DESCRIPTION OF THE DRAWINGS

FIG. 6 shows an exemplary ASN.1 data structure defining a radio resource control (RRC) RLF-TimersAndConstants information element (IE).

FIG. 9 shows an exemplary ASN.1 data structure for an RRC RACH-ConfgCommon IE.

FIG. 10 shows an exemplary ASN.1 data structure for a UEInformationRequest message.

FIG. 11, which includes FIGS. 11A-C, shows an exemplary ASN.1 data structure for a UEInformationResponse message.

FIGS. 12-13 show flow diagrams of exemplary methods (e.g., procedures) for sorting neighbor cell measurements into a list, according to various exemplary embodiments of the present disclosure.

DETAILED DESCRIPTION

Figure 1:
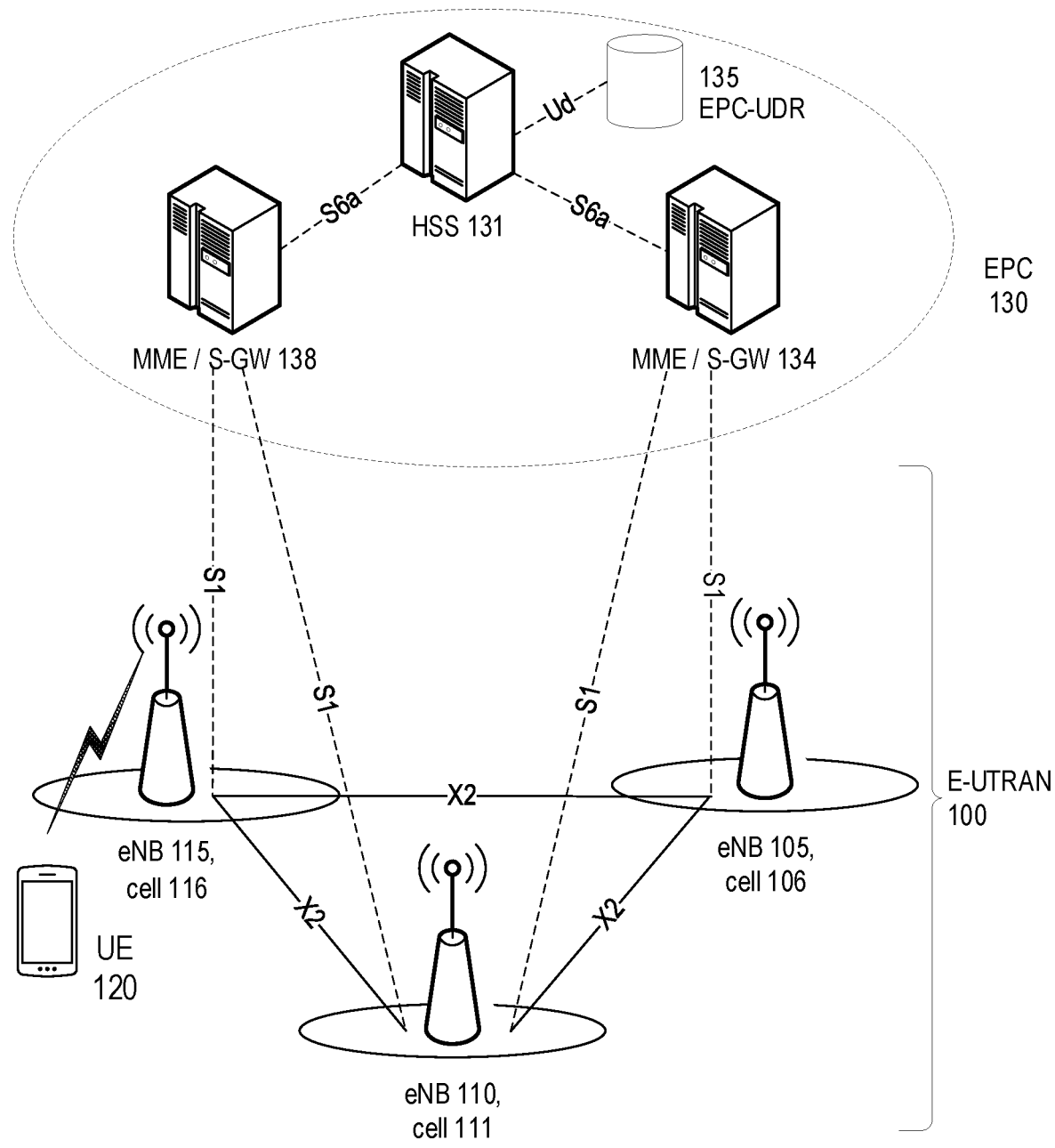
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
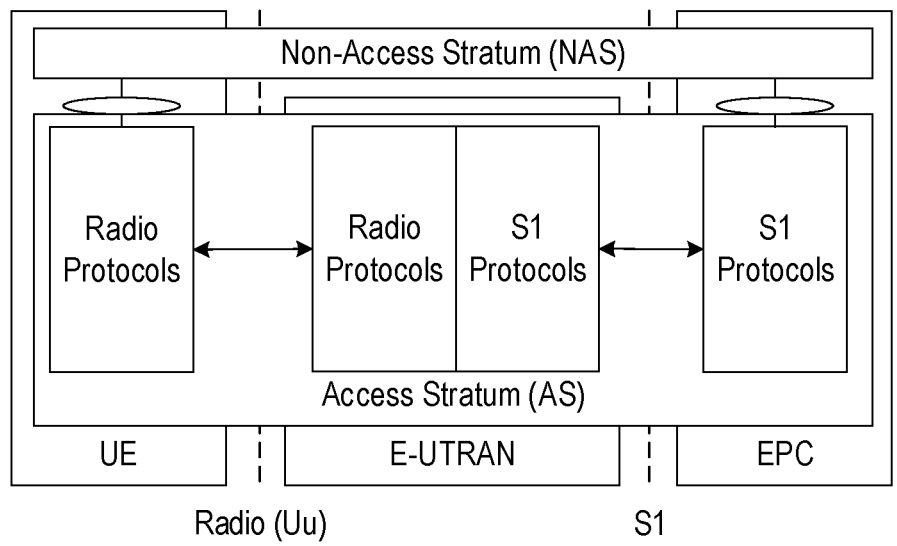
FIG. 2A is a high-level block diagram of an exemplary E-UTRAN architecture in terms of its constituent components, protocols, and interfaces.
Figure 2B:
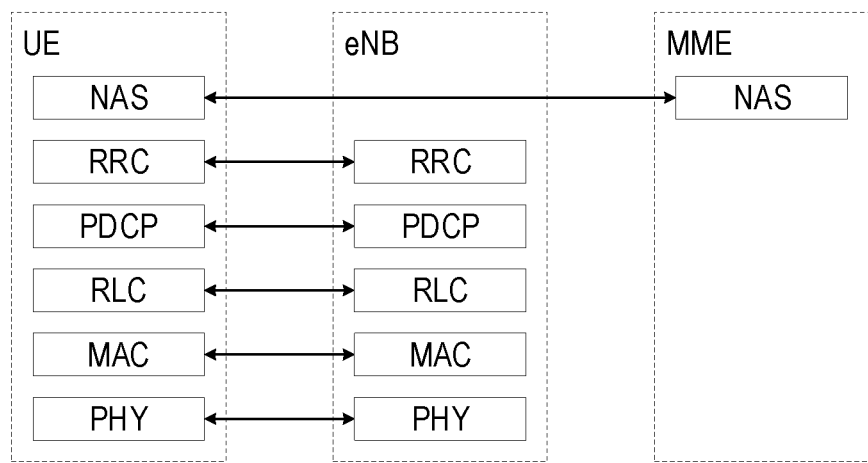
FIG. 2B is a block diagram of exemplary protocol layers of the control-plane portion of the radio (Uu) interface between a user equipment (UE) and the E-UTRAN.
Figure 3:
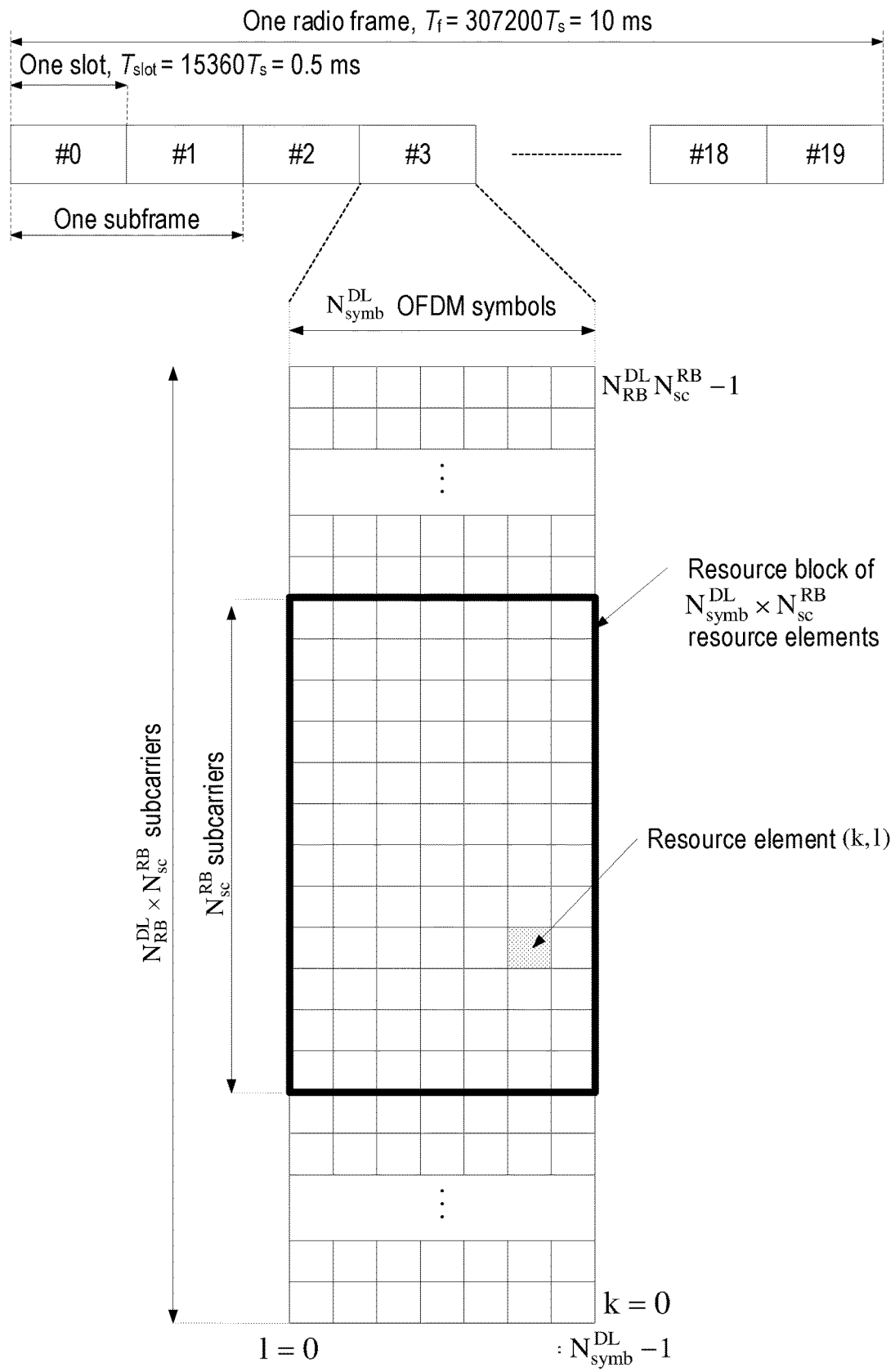
FIG. 3 is a block diagram of an exemplary downlink LTE radio frame structure used for frequency division duplexing (FDD) operation.

Embodiments summarized above will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (SMF), a location management function (LMF), a user plane function (UPF), a Network Exposure Function (NEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, in the current radio link failure (RLF) procedure, a UE logs relevant information at the time of RLF and later reports such information to the network via a target cell to which the UE ultimately connects (e.g., after reestablishment). The reported information can include radio resource management (RRM) measurements of various neighbor cells prior to the mobility operation (e.g., handover). Even so, how the UE sorts, orders, and/or prioritizes such neighbor cell measurements in the report is undefined. This can cause ambiguity, uncertainty, and/or confusion in how the network interprets such measurements in UE RLF reports, which is discussed in more detail below.

As mentioned above, before LTE Rel-13, only two RRC states were defined for a UE: RRC_IDLE and RRC_CONNECTED. In LTE Rel-13, a mechanism was introduced for the UE to be suspended by the network in a suspended state similar to RRC_IDLE but with some important differences. First, the suspended state is not a third RRC "state" alongside RRC_IDLE and RRC_CONNECTED; rather it can be viewed as a "sub-state" of RRC_IDLE. Second, both the UE and the serving eNB store the UE's AS (e.g., S1-AP) context and RRC context after suspension. Later when the suspended UE needs to resume a connection (e.g., to send UL data), instead of going through the conventional service request procedure, the suspended UE merely sends an RRC-ConnectionResume-Request message to the eNB. The eNB resumes the S1AP context and responds with a RRCConnectionResume message. There is no elaborate exchange of security context between MME and eNB and no setup of AS security context. The preserved AS and RRC contexts are merely resumed from where they were suspended earlier. Reducing the signaling can reduce UE latency (e.g., for smart phones accessing Internet) and UE signaling. This can lead to reduced UE energy consumption, particularly for machine type communication (MTC) devices that send very little data such that signaling is a primary consumer of energy.

In 3GPP, a study item on a new radio interface for 5G has recently been completed and 3GPP has now continued with the effort to standardize this new radio interface, often abbreviated by NR (New Radio). While LTE was primarily designed for user-to-user communications, 5G/NR networks are envisioned to support both high single-user data rates (e.g., 1 Gb/s) and large-scale, machine-to-machine communication involving short, bursty transmissions from many different devices that share the frequency bandwidth.

Similar to LTE, NR uses CP-OFDM (Cyclic Prefix Orthogonal Frequency Division Multiplexing) in the downlink and both CP-OFDM and DFT-spread OFDM (DFT-S-OFDM) in the uplink. In the time domain, NR downlink and uplink physical resources are organized into equally-sized subframes of 1 ms each. A subframe is further divided into multiple slots of equal duration, with each slot including multiple OFDM-based symbols.

In NR, the RRC states include an RRC_INACTIVE state with similar properties as the suspended sub-state in LTE Rel-13. However, the RRC_INACTIVE state has slightly different properties in that it is a separate RRC state and not part of RRC_IDLE as in LTE. Additionally, the CN/RAN connection (NG or N2 interface) is kept alive during RRC_INACTIVE while it was suspended in LTE.

In RRC_CONNECTED state, the network typically configures the UE to perform and report RRM measurements to assist network-controlled mobility decisions such as handover from one cell to another. A RLF procedure is typically triggered in the UE when something unexpected happens in any of the mobility-related procedures, including handover. The RLF procedure involves interactions between RRC and lower layer protocols such as PHY (or L1), MAC, RLC, etc. including radio link monitoring (RLM) on L1.

Upon handover failure (HOF) and RLF, the UE may take autonomous actions such as trying to select a cell and initiate reestablishment procedure so that the UE can remain reachable by the network. In general, a UE declares RLF only when the UE realizes that there is no reliable communication channel (or radio link) available between itself and the network, which can result in poor user experience. Also, reestablishing the connection requires signaling with a newly selected cell (e.g., random access procedure, exchanging various RRC messages, etc.), introducing latency until the UE can again reliably transmit and/or receive user data with the network.

According to 3GPP TS 36.331 (v15.7.0), the possible causes for RLF include:
1) Expiry of the radio link monitoring (RLM) related timer T310;
2) Expiry of the measurement reporting associated timer T312 (not receiving the handover command from the network within this timer's duration despite sending the measurement report when T310 was running);
3) Upon reaching the maximum number of RLC retransmissions; and
4) Upon receiving random access problem indication from the MAC entity.

Since RLF leads to reestablishment in a new cell and degradation of UE/network performance and end-user experience, it is in the interest of the network to understand the reasons for UE RLF and to optimize mobility-related parameters (e.g., trigger conditions of measurement reports) to reduce, minimize, and/or avoid subsequent RLFs. Before Rel-9 mobility robustness optimizations (MRO), only the UE was aware of radio quality at the time of RLF, the actual reason for declaring RLF, etc. To identify the RLF cause, the network requires more information from the UE and from the neighboring base stations (e.g., eNBs).

As noted above, various issues and/or problems can trigger RLF in LTE and NR. However, for the purposes of the present disclosure, the two most important are: 1) RLF due to radio link or PHY problem (e.g., expiry of timer T310); and 2) RLF due to random access problem, as indicated by MAC layer. Although RLF can be triggered by other causes (e.g., RLC), discussion of these are omitted for sake of brevity and/or simplicity.

The principle of RLM is similar in LTE and NR. In general, the UE monitors link quality of the UE's serving cell and uses that information to decide whether the UE is in-sync (IS) or out-of-sync (OOS) with respect to that serving cell. In LTE, RLM is carried out by the UE measuring downlink reference signals (e.g., CRS) in RRC_CONNECTED state. If RLM (i.e., by L1/PHY) indicates number of consecutive OOS conditions to the UE RRC layer, then RRC starts a radio link failure (RLF) procedure and declares RLF after expiry of a timer (e.g., T310). The L1 RLM procedure is carried out by comparing the estimated CRS measurements to some target block error rates (BLERs), called Qout and Qin. In particular, Qout and Qin correspond to BLER of hypothetical PDCCH/PCIFCH transmissions from the serving cell, with exemplary values of 10% and 2%, respectively. In NR, the network can define the RS type (e.g., CSI-RS and/or SSB), exact resources to be monitored, and even the BLER target for IS and OOS indications.

Figure 4:
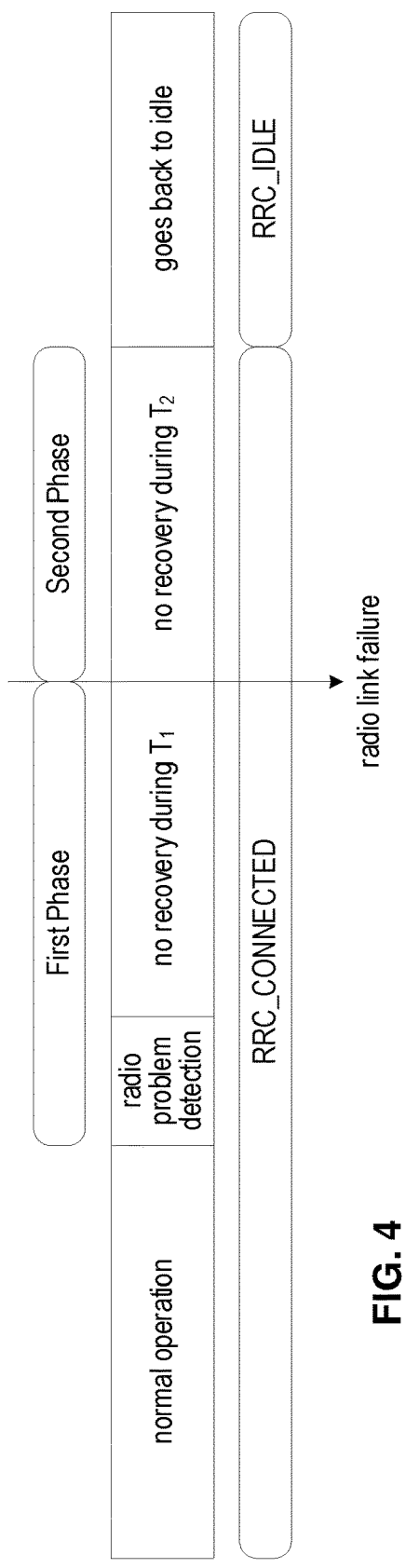
FIG. 4 shows a high-level timing diagram illustrating two phases of an exemplary radio link failure (RLF) procedure in LTE and NR, according to various exemplary embodiments of the present disclosure.

FIG. 4 shows a high-level timing diagram illustrating the two phases of a RLF procedure in LTE and NR. The first phase starts upon radio problem detection and leads to radio link failure detection after no recovery is made during a period T1. The second phase starts upon RLF detection or handover failure and ends with the UE returning to RRC_IDLE if no recovery is made during a period T2.

Figure 5:
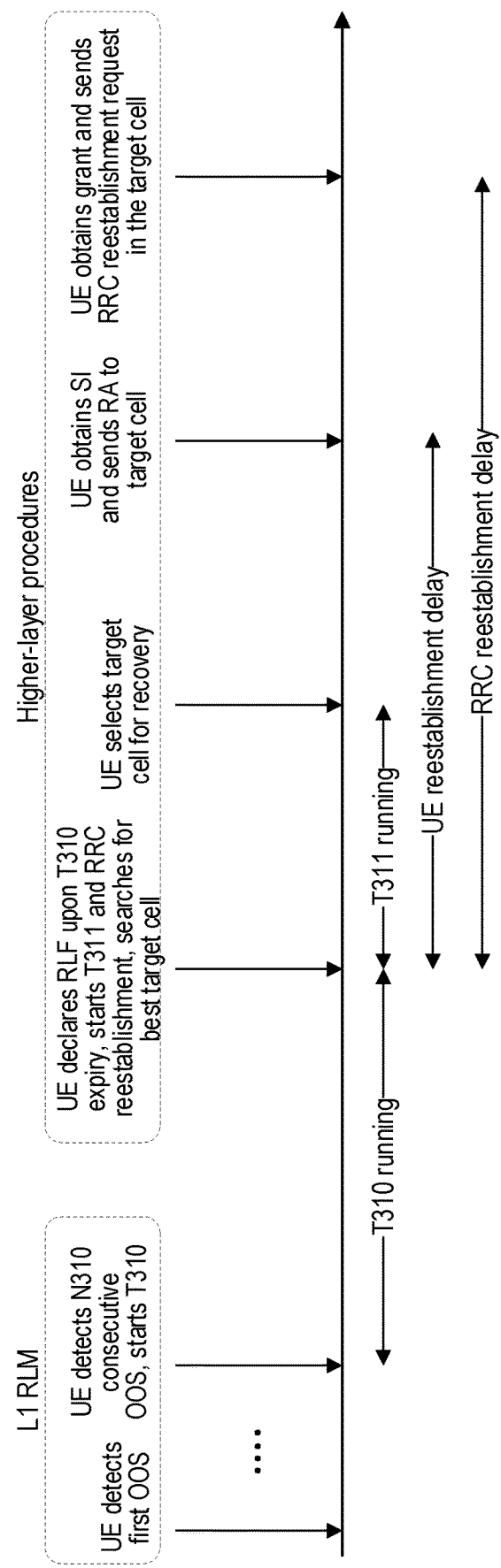
FIG. 5 shows a more detailed version of a UE's operations during an exemplary LTE RLF procedure.

FIG. 5 shows a more detailed version of the UE's operations during an exemplary LTE RLF procedure. In this example, the UE detects N310 consecutive OOS conditions during L1 RLM procedures, as discussed above, and then initiates timer T310. Subsequent operations are performed by higher layers (e.g., RRC). After expiry of T310, the UE starts T311 and RRC reestablishment, searching for the best target cell for reestablishment. After selecting a target cell for reestablishment, the UE obtains system information (SI) for the target cell and performs a random access (e.g., via RACH). The duration after T310 expiry until this point can be considered the UE's reestablishment delay. Ultimately, the UE obtains access to the target cell and sends an RRC Reestablishment Request message to the target cell. The duration after T310 expiry until this point can be considered the total RRC reestablishment delay.

These operations are further specified in 3GPP TS 36.331 (v15.7.0), a relevant portion of which is provided in the excerpt below.

*Begin Excerpt from 3GPP Specification*
5.2.2.9 Actions Upon Reception of SystemInformationBlockType2
Upon receiving SystemInformationBlockType2, the UE shall:
  1> apply the configuration included in the radioResourceConfgCommon;
. . .
  1> if in RRC_CONNECTED and UE is configured with RLF timers and constants values received within rlf-TimersAndConstants:
    2> not update its values of the timers and constants in ue-TimersAndConstants except for the value of timer T300;
5.3.10.0 General
The UE shall:
. . .
  1> if the received radioResourceConfigDedicated includes the rif-TimersAndConstants:
    2> reconfigure the values of timers and constants as specified in 5.3.10.7;
. . .
5.3.10.7 Radio Link Failure Timers and Constants Reconfiguration
The UE shall:
  1> if the received rlf-TimersAndConstants is set to release:
    2> use values for timers T301, T310, T311 and constants N310, N311, as included in ue-TimersAndConstants received in SystemInformationBlockType2 (or SystemInformationBlockType2-NB in NB-IoT);

1> else:
  2> reconfigure the value of timers and constants in accordance with received rlf-TimersAndConstants;
1> if the received rlf-TimersAndConstantsSCG is set to release:
  2> stop timer T313, if running, and
  2> release the value of timer t313 as well as constants n313 and n314;
1> else:
  2> reconfigure the value of timers and constants in accordance with received rlf-TimersAndConstantsSCG;
. . .

5.3.10.11 SCG Dedicated Resource Configuration
The UE shall:
1> if the received radioResourceConfigDedicatedSCG includes the rlf-TimersAndConstantsSCG:
  2> reconfigure the values of timers and constants as specified in 5.3.10.7;
. . .

5.3.11.1 Detection of Physical Layer Problems in RRC_CONNECTED
The UE shall:
1> upon receiving N310 consecutive "OOS" indications for the PCell from lower layers while neither T300, T301, T304 nor T311 is running:
  2> start timer T310;
1> upon receiving N313 consecutive "OOS" indications for the PSCell from lower layers while T307 is not running:
  2> start T313;
    NOTE: Physical layer monitoring and related autonomous actions do not apply to SCells except for the PSCell.

5.3.11.2 Recovery of Physical Layer Problems
Upon receiving N311 consecutive "IS" indications for the PCell from lower layers while T310 is running, the UE shall:
1> stop timer T310;
1> stop timer T312, if running;
  NOTE 1: In this case, the UE maintains the RRC connection without explicit signaling, i.e., the UE maintains the entire radio resource configuration.
  NOTE 2: Periods in time where neither "IS" nor "OOS" is reported by layer 1 do not affect the evaluation of the number of consecutive "IS" or "OOS" indications.
Upon receiving N314 consecutive "IS" indications for the PSCell from lower layers while T313 is running, the UE shall:
1> stop timer T313;
*End excerpt from 3GPP specification*

In addition, FIG. 6 shows an exemplary ASN.1 data structure (also taken from 3GPP TS 36.331) defines an RRC RLF-TimersAndConstants information element (IE) containing UE-specific timers and constants applicable for UEs in RRC_CONNECTED state. Definitions of certain fields in FIG. 6 are provided in the tables below.

| RLF-TimersAndConstants field descriptions |
| --- |
| n3xy |
| Constants are described in section 7.4. n1 corresponds with 1, n2 corresponds with 2 and so on. |

| RLF-TimersAndConstants field descriptions |
| --- |
| t3xy |
| Timers are described in section 7.3. Value ms0 corresponds with 0 ms, ms50 corresponds with 50 ms and so on. E-UTRAN configures RLF-TimersAndConstants-r13 only if UE supports ce-ModeB. UE shall use the extended values t3xy-v1310 and t3xy-v1330, if present, and ignore the values signaled by t3xy-r9. |

| Timer | Start | Stop | At expiry |
| --- | --- | --- | --- |
| T301 NOTE1 | Transmission of RRCConnection-Reestabilshment-Request | Reception of RRCConnection-Reestablishment or RRCConnection-ReestablishmentReject message as well as when the selected cell becomes unsuitable | Go to RRC_IDLE |
| T310 NOTE1 NOTE2 | Upon detecting physical layer problems for the PCell i.e., upon receiving N310 consecutive OOS indications from lower layers | Upon receiving N311 consecutive IS indications from lower layers for the PCell, upon triggering the handover procedure and upon initiating the connection re-establishment procedure | If security is not activated: go to RRC_IDLE else: initiate the connection re-establishment procedure |
| T311 NOTE1 | Upon initiating the RRC connection re-establishment procedure | Selection of a suitable E-UTRA cell or a cell using another RAT. | Enter RRC_IDLE |
| T313 NOTE2 | Upon detecting physical layer problems for the PSCell i.e., upon receiving N313 consecutive OOS indications from lower layers | Upon receiving N314 consecutive IS indications from lower layers for the PSCell, upon initiating the connection re-establishment procedure, upon SCG release and upon receiving RRCConnection-Reconfiguration including MobilityControlInfoSCG | Inform E-UTRAN about the SCG radio link failure by initiating the SCG failure information procedure as specified in 5.6.13. |

NOTE1:
Only the timers marked with "NOTE1" are applicable to NB-IoT.
NOTE2:
The behaviour as specified in 7.3.2 applies

| Constant | Usage |
| --- | --- |
| N310 | Maximum number of consecutive "OOS" indications for the PCell received from lower layers |
| N311 | Maximum number of consecutive "IS" indications for the PCell received from lower layers |
| N313 | Maximum number of consecutive "OOS" indications for the PSCell received from lower layers |
| N314 | Maximum number of consecutive "IS" indications for the PSCell received from lower layers |

When no discontinuous reception (DRX) is configured, OOS occurs when the downlink radio link quality estimated over the last 200 ms period becomes worse than the threshold Qout. Similarly, without DRX the IS occurs when the downlink radio link quality estimated over the last 100 ms period becomes better than the threshold Qin. Upon detection of out-of-sync, the UE initiates the evaluation of in-sync.

When DRX is used to reduce UE energy consumption, the OOS and IS evaluation periods are extended based on the configured DRX cycle length. The UE starts IS evaluation whenever OOS occurs. Therefore, the same period (TEvaluate_Qout_DRX) is used for the evaluation of OOS and IS. However, upon starting the RLF timer (T310) until its expiry, the IS evaluation period is shortened to 100 ms, which is the same as without DRX. If the timer T310 is stopped due to N311 consecutive IS indications, the UE performs IS evaluation according to the DRX based period (TEvaluate_Qout_DRX).

In summary, the LTE RLM procedure is based on measuring cell-specific reference signals (CRS) to "estimate" the PDCCH quality, which relies on the UE being in RRC_CONNECTED state in an LTE serving cell transmitting PDCCH and CRS. The CRS are associated with a specific physical cell identifier (PCI). Moreover, LTE RLM has been specified so that the network does not need to configure any parameter, with the UE generating IS/OOS events internally for detection of radio link problems. On the other hand, RLF procedures (including SCG failures) are controlled by RRC and configured by the network via counters N310, N311, N313, N314 (which work as filters to avoid too early RLF triggering) and timers T310, T311, T313, and T314.

Figure 7:
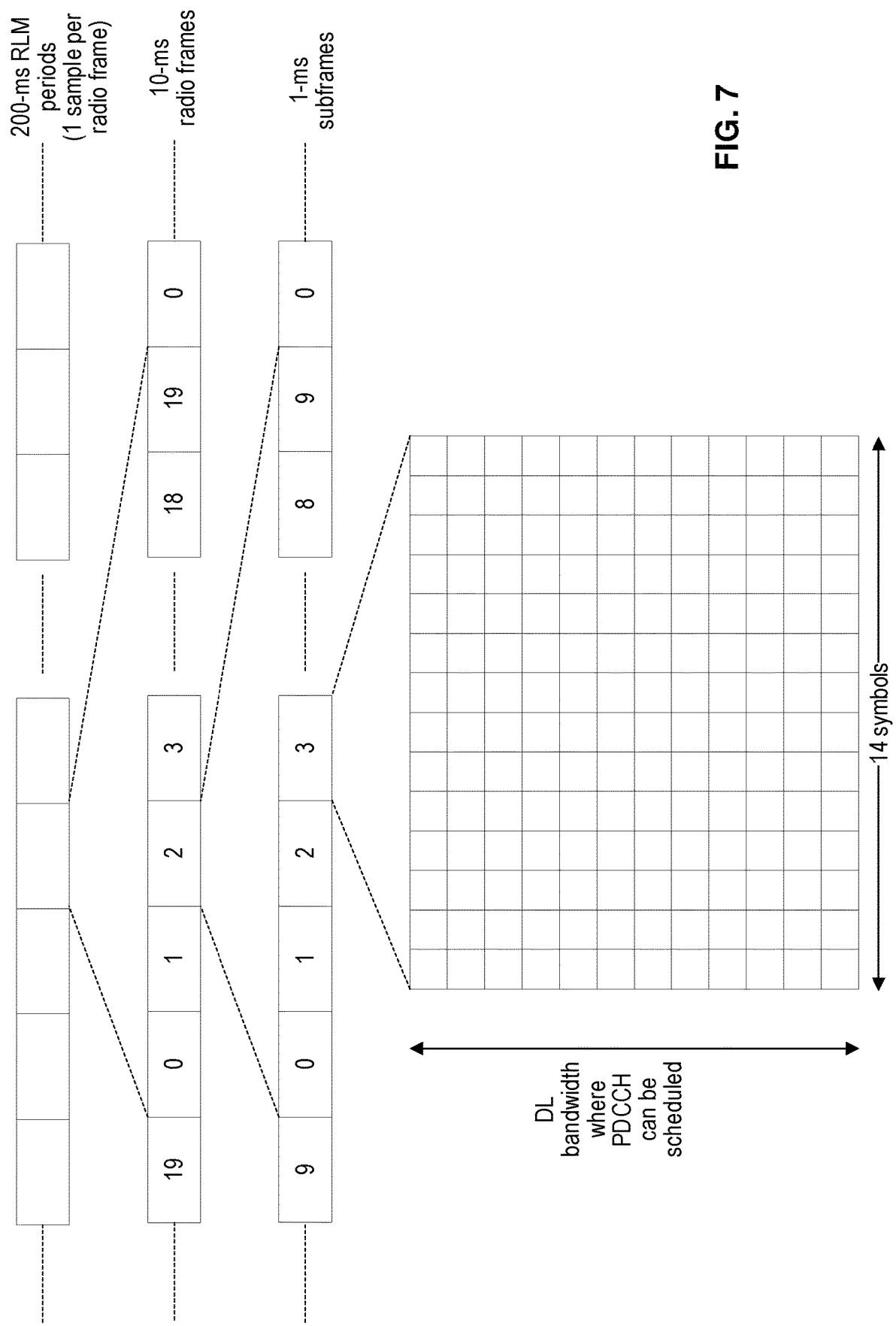
FIG. 7 shows an exemplary arrangement for estimating physical downlink control channel (PDCCH) quality based on UE radio link monitoring (RLM) measurements.

The mapping between CRS-based RLM measurements and a hypothetical PDCCH BLER is left up to UE implementation. However, the performance is verified by conformance tests defined for various environments. Also, the downlink quality is calculated based on the RSRP of CRS over the whole band since UE does not necessarily know where PDCCH is going to be scheduled. This is illustrated in FIG. 7.

In LTE, RLF can also be triggered by problems in a random access (RA) procedure, which takes place at the MAC layer (e.g., as defined in 3GPP TS 36.321). Random access in LTE can be configured as contention-based random access (CBRA), which has an inherent risk of collision, or contention-free RACH (CFRA), in which dedicated RA resources are reserved/allocated by the network for a particular UE at a particular time. For example, the network may configure CFRA during handover of a UE.

Figure 8:
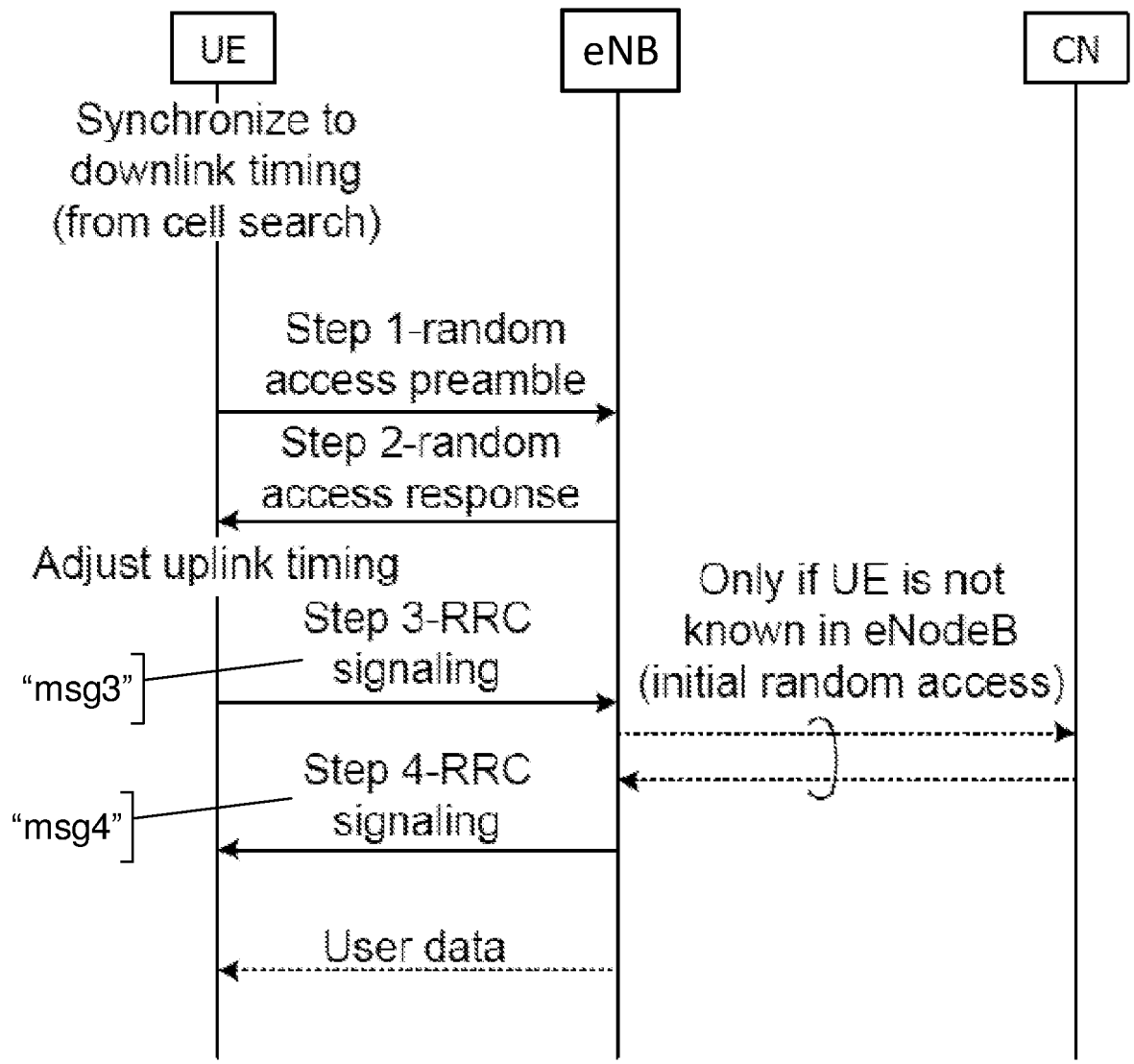
FIG. 8 illustrates certain operations of an exemplary LTE random access (RA) procedure initiated by a UE.

FIG. 8 illustrates the steps (i.e., operations) in an exemplary LTE CBRA procedure. In Step 1, the UE randomly selects one access preamble from a known set of preambles transmitted by the network through the broadcast channel. The purpose is to avoid collisions by separating the preambles in a code domain. In LTE there are typically 64 different available preambles in each cell. These may be divided into multiple preamble groups, which allows the UE to signal with one bit whether it needs radio resources for a small or large message (data package). That is, a preamble randomly selected from one group can indicate that the UE has a small amount of data to send, while a preamble randomly selected from another group indicates that resources for a larger amount of data are needed.

The UE transmits the RA preamble only on certain UL time/frequency resources, which are made known to all UEs via broadcast system information (SI). The eNB detects all non-colliding preambles transmitted by UEs in these resources and estimates the roundtrip time (RTT) for each UE. The RTT is needed to achieve time and frequency synchronization in both DL and UL for the UE in the LTE OFDM-based system.

In Step 2, the RA response (RAR) from the eNB to the UE carries the RTT, a temporary UE identity (e.g., temporary cell RNTI, TC-RNTI), and UL resources to use in Step 3. As mentioned above, the UE can use the received RTT to adjust its transmission window in order to obtain UL synchronization. The RAR is scheduled on a DL shared channel (e.g., PDSCH) and is indicated on a DL control channel (e.g., PDCCH) using an identity reserved for RARs. All UEs that have transmitted a RA preamble monitor DL control channels for a RAR within a time window after their preamble transmissions. If the UE does not detect a RAR within the time window, it declares a failed attempt and repeats Step 1 using an increased transmit power.

The received UL resource assignment to be used in Step 3 is essentially a pointer (e.g., to a location on the UL time/frequency resource grid) that informs the UE exactly which subframes (time) to transmit in and what resource blocks (frequency) to use. The higher layers indicate the 20-bit UL Grant to the PHY, as defined in 3GPP TS 36.321 and 36.213. In the LTE PHY, this is referred to the RAR Grant and is carried on the PDCCH by a specific format of downlink control information (DCI). The RAR Grant size is intended to balance between minimizing number of bits to convey the resource assignment while providing some resource assignment flexibility for the eNB scheduler. In general, the length of the PHY message depends on the system bandwidth.

Upon correct reception of the RAR in Step 2, the UE is time synchronized with the eNB. The UE transmission in Step 3 (referred to as "message 3" or "msg3" for short) uses the UL channel radio resources assigned in Step 2. If the UE already has a C-RNTI assigned in this cell, the UE includes that C-RNTI in msg3; otherwise, the UE includes the TC-RNTI received in msg2. Additional message exchange might also be needed depending on the UE state. For example, if the UE is not known in the eNB, then some signaling is needed between the eNB and the core network (indicated in FIG. 8 by the arrows drawn with dashed lines).

In Step 4, the eNB sends msg4 via RRC to possibly resolve contention. In particular, msg4 includes the (T)C-RNTI received in msg3 to indicate that contention is resolved for that particular C-RNTI. If the C-RNTI in msg4 matches the one that a UE sent in msg3, then the UE considers contention resolved. Otherwise, in case a collision is detected with contention unresolved, the UE shall perform preamble re-transmission and initiates random access again. Collision is detected based on:
  After transmitting msg3 using a C-RNTI assigned by target cell (e.g., in handover or when UE is in RRC-_CONNECTED), UE detects a msg4 not addressing its C-RNTI and contention resolution timer expires; or
  After transmitting msg3 using a TC-RNTI assigned in the RAR, UE detects a msg4 addressing the same TC-RNTI but the UE Identity in the msg4 payload does not match the UE's identity transmitted on msg3.

Note that the UE MAC layer does not consider collision to be a failure case. As such, upper layers are not aware that a collision has occurred.

In addition to the cases mentioned above, preamble retransmission is also triggered when the UE sends a preamble and does not receive a RAR within a RAR time window. In that case, the UE performs preamble power ramping and transmits the preamble again. In all these cases, when RAR time window expires (for CFRA or CBRA) or when collision is detected, the UE performs preamble retransmission. A parameter in the RACH-ConfigCommon IE provided to the UE via RRC signaling from the eNB controls how many times the UE shall do that. FIG. 9 shows an ASN.1 data structure defining an exemplary RACH-ConfigCommon IE.

As mentioned above, a RLF reporting procedure was introduced as part of MRO in LTE Rel-9. In this procedure, a UE logs relevant information at the time of RLF and later reports such information to the network via a target cell to which the UE ultimately connects (e.g., after reestablishment). The procedure not only introduced new RRC signaling between UE and the network (e.g., a target eNB hosting the target cell), but also introduced signaling between nodes in the network (e.g., X2AP signaling specified in 3GPP TS 36.423). For example, an eNB receiving an RLF report could forward some or all of the report to the eNB in which the RLF originated. In general, the UE-reported RLF information can include any of the following:

- Measurement quantities (RSRP, RSRQ) of the last serving cell (PCell).
- Measurement quantities of the neighbor cells in different frequencies of different RATs (e.g., EUTRA, UTRA, GERAN, CDMA2000).
- Measurement quantity (RSSI) associated to WLAN APs.
- Measurement quantity (RSSI) associated to Bluetooth beacons.
- Location information, if available (including location coordinates and velocity)
- Globally unique identity of the last serving cell, if available, otherwise the PCI and the carrier frequency of the last serving cell.
- Tracking area code of the PCell.
- Time elapsed since the last reception of the 'Handover command' message.
- C-RNTI used in the previous serving cell.
- Whether or not the UE was configured with a DRB having QCI=1.

More specifically, for LTE, the UE's detection and logging of the RLF related parameters is specified in 3GPP TS 36.331 (v15.7.0). Relevant portions are provided in the excerpt below, with underline emphasis added to the portions most relevant to the present discussion.

\*\*\*Begin Excerpt from 3GPP Specification\*\*\*
5.3.11.3 Detection of Radio Link Failure
The UE shall:
1> upon T310 expiry; or
1> upon T312 expiry; or
1> upon random access problem indication from MCG MAC while neither T300, T301, T304 nor T311 is running; or
1> upon indication from MCG RLC, which is allowed to be send on PCell, that the maximum number of retransmissions has been reached for an SRB or DRB:
  2> consider radio link failure to be detected for the MCG i.e., RLF;
  2> except for NB-IoT, store the following radio link failure information in the VarRLF-Report by setting its fields as follows:
    3> clear the information included in VarRLF-Report, if any;
    3> set the plmn-IdentityList to include the list of EPLMNs stored by the UE (i.e., includes the RPLMN);
    3> set the measResultLastServCell to include the RSRP and RSRQ, if available, of the PCell based on measurements collected up to the moment the UE detected radio link failure;
    3> set the measResultNeighCells to include the best measured cells, other than the PCell, ordered such that the best cell is listed first, and based on measurements collected up to the moment the UE detected radio link failure, and set its fields as follows;
      4> if the UE was configured to perform measurements for one or more EUTRA frequencies, include the measResultListEUTRA:
      4> if the UE was configured to perform measurement reporting for one or more neighbouring UTRA frequencies, include the measResultListUTRA;
      4> if the UE was configured to perform measurement reporting for one or more neighbouring GERAN frequencies, include the measResultListGERAN;
      4> if the UE was configured to perform measurement reporting for one or more neighbouring CDMA2000 frequencies, include the measResultsCDMA2000;
      4> for each neighbour cell included, include the optional fields that are available;
NOTE 1: The measured quantities are filtered by the L3 filter as configured in the mobility measurement configuration. The measurements are based on the time domain measurement resource restriction, if configured. Blacklisted cells are not required to be reported.
. . .
The UE may discard the radio link failure information, i.e., release the UE variable VarRLF-Report, 48 hours after the radio link failure is detected, upon power off or upon detach.
\*\*\*End excerpt from 3GPP specification\*\*\*

After the UE declares RLF and logs the relevant information for reporting (e.g., in a variable VarRLF-Report), the UE selects a target cell and if it succeeds with a reestablishment towards that target cell, the UE includes in the RRCReestablishmentComplete message an indication that it has an RLF report available. If the eNB serving the target cell wants to receive the RLF report, it sends the UE an UEInformationRequest message with a flag "rlf-ReportReq-r9". In response, the UE sends the eNB an UEInformationResponse message that includes the RLF report.

FIG. 10 shows an ASN.1 data structure that defines an exemplary UEInformationRequest message. Note that the rlf-ReportReq-r9 and rach-ReportReq-r9 fields in the UEInformationRequest-r9-IEs are Boolean variables that indicate whether or not the network is requesting the respective reports from the UE. In addition, FIG. 11, which includes FIGS. 11A-C, shows an ASN.1 data structure that defines an exemplary UEInformationResponse message sent by the UE in response to a UEInformationRequest message. In particular, the IEs RLF-Report-r9 (FIG. 11B) and RLF-Report-v9e0 (FIG. 11C) contain RLF reporting information relevant to the present discussion. For example, these IEs can be sent in response to the network requesting an RLF report via rlf-ReportReq-r9.

Based on the contents of the RLF report (e.g., a globally unique identity of the last serving cell), the eNB serving the target cell (i.e., the UE's new serving cell) can determine the cell where the RLF originated and forward the RLF report to the source eNB serving that cell. Based on receiving this report, the source eNB can possibly tune the handover-related parameters (e.g., measurement report triggering thresholds) for that cell, including the parameters that led to the UE's RLF. Two different types of inter-node messages have been standardized in in 3GPP TS 36.423 for sending RLF reports between nodes: Radio linkfailure indication and Handover report.

Although RLF reports can include RRM measurements of neighbor cells (e.g., the UE's last serving cell) in different frequencies and/or different RATs (e.g., EUTRA, UTRA, GERAN, CDMA2000), there currently is no defined way for the UE to sort, order, and/or prioritize such RRM measurements in the RLF report. Rather, as shown by the underlined portion of the above excerpt from 3GPP TS 36.331, the UE is merely required to "set the measResultNeighCells to include the best measured cells, other than the PCell, ordered such that the best cell is listed first, and based on measurements collected up to the moment the UE detected radio link failure." This vague requirement can cause different UEs to sort and/or order neighbour cell measurements in different ways, leading to ambiguity of interpretation by the eNB receiving the report.

In addition, for NR, a UE can have measurements based on more than one reference signals, such as SSB and CSI-RS. This can also create ambiguity in an RLF report. For example, in such a scenario, the UE does not know if it should sort the measurements based on only one reference signal and report both measurements, or if it should sort based on both reference signals and report accordingly.

Accordingly, exemplary embodiments of the present disclosure provide novel, flexible, and efficient techniques for a UE to sort available RRM measurements on the neighboring cells for inclusion in a RLF report to be sent to a target node (e.g., hosting the UE's new serving cell) after the UE determines RLF in a previous serving cell (e.g., hosted by a different source node). By relying on clear and deterministic sorting rules, such techniques reduce and/or eliminate ambiguities in interpreting such RLF reports by the network. Consequently, such techniques can improve a network's ability to perform remedial actions for cells in which the reported RLF occurs, which can reduce and/or eliminate subsequent RLF failures in such cells.

In general, these exemplary techniques can be subdivided into two groups of embodiments (also referred to as "solutions"). In a first group of embodiments, the UE can sort available RRM measurements per frequency and per reference signal type (e.g., SSB or CSI-RS), using one or more measurement quantities (e.g., RSRP, RSRQ, SINR, etc.) as sorting criteria. The one or more criteria can be selected from the available measurement quantities configured by the network.

In some of these embodiments, the UE can sort the available RRM measurements per frequency and per reference signal type according to the following priority of sorting criteria: 1) based on RSRP, if RSRP is available; 2) otherwise based on RSRQ, if RSRQ is available; 3) otherwise based on SINR, if SINR is available; 4) otherwise based on some default criterion.

In other of these embodiments, the UE can create a list of sorted RRM measurements per {RS-type, measurement quantity} tuple. For example, if there are three (3) measurement quantities and two (2) RS types, the UE can create six (6) sorted lists for each measured frequency. In some embodiments, the network can limit the number of RS-types and measurement quantities used for sorting algorithms (e.g., via RRC configuration of the UE). In some embodiments, a UE can limit the RS-types and measurement quantities used as sorting criteria, based on a policy and/or priority defined by the network or pre-configured in the UE. However, even though a subset of available RS types and/or measurement quantities are used for sorting, the UE can include in the RLF report values of other measurement quantities and/or RS types (i.e., those not used for sorting) for each neighbor cell that was measured.

FIG. 12 shows a flow diagram of an exemplary method (e.g., procedure) for sorting neighboring cell measurements into a list (e.g., a measResultNeighCells IE) according to the first group of embodiments. The exemplary method shown in FIG. 12 can be performed by a user equipment (e.g., UE, wireless device, MTC device, NB-IoT device, modem, etc. or component thereof). Although FIG. 12 shows specific blocks in a particular order, the operations of the exemplary method can be performed in a different order than shown and can be combined and/or divided into blocks having different functionality than shown. Optional blocks or operations are indicated by dashed lines.

In operation 1201, the UE selects a frequency from among the available frequencies having RRM measurements (e.g., the frequency set configured via RRC IE MeasObjectNR). In one embodiment, the UE performs measurements for each configured frequency and, in 1201, selects each of these frequencies in turn. In another embodiment, the UE can select frequencies in a particular order, e.g., according to a priority and/or policy configured by the network or pre-configured in the UE.

In operation 1202, the UE selects a RS type from among the available RS types having RRM measurements (e.g., the RS set configured via RRC IE MeasObjectNR). In one embodiment, the UE select each available RS type in turn. In another embodiment, the UE can select RS types in a particular order, e.g., according to a priority and/or policy configured by the network or pre-configured in the UE. As an example, such a policy could exclude certain RS for sorting selection in operation 1202 (i.e., these RS would not be available).

In operation 1203, the UE selects a measurement quantity from the available measurement quantities (e.g., the measurements quantities configured via RRC IE MeasObjectNR, such as RSRP, RSRQ, SINR, etc.) as a sorting criterion. The UE's selection can be further based on whether the selected measurement quantities are available (e.g., have been measured) for the selected frequency (e.g., in 1201) and the selected RS types (e.g., in 1202). For example, a policy (e.g., configured by the network or pre-configured in the UE) could exclude certain measurement quantities for selection as sorting criteria in operation 1203 (i.e., these measurement quantities would not be available).

In some embodiments, the measurement quantity can be selected in operation 1203 according to a priority order configured by the network and/or pre-configured in the UE. For example, the selected measurement quantity can be: 1) RSRP if available for selected frequency and RS type; 2) otherwise RSRQ if available; 3) otherwise SINR if available; 4) otherwise some default criterion. In other embodiments, the UE can select multiple measurement quantities as sorting criteria, which can be used to generate respective sorted lists (as discussed below).

In operation 1204, the UE sorts the RRM measurements for the selected frequency based on the currently selected {RS-type, measurement quantity} tuple. Sorting algorithms can include linear sorting, quick sorting, etc. In some embodiments, the UE can sort the available RRM measurements with equal values ("ties") based on a secondary sorting criterion, e.g., chosen from available measurement quantities. In cases where the UE selected multiple measurement quantities as sorting criteria, the UE can generate a sorted list based on each sorting criterion in operation 1204.

In operation 1205, the UE creates (e.g., compiles) a list of sorted measurements per frequency. For example, UE can append the list determined for the currently selected frequency to an existing list of sorted measurements from previously selected frequencies. In case the UE generated multiple sorted lists in operation 1204 based on different sorting criteria, the UE can create a list for each sorting criterion used.

In some embodiments, when multiple measurement quantities exist for the selected frequency and RS type (e.g., the UE has measured by RSRP and RSRQ), the UE may create/compile multiple lists of the sorted measurements for each {RS-type, measurement quantity} tuple (e.g., {SSB, RSRP}, {CSI-RS, RSRQ}, {SSB, SINR}, etc.).

In some embodiments, the UE can include only the measurement quantity selected as the sorting criterion in the list of RRM measurements. In other embodiments, although the sorting criterion can be one measurement quantity, all the available other measurement quantities are also included in the list of sorted measurements. For example, when RSRP is used as the sorting criterion, the UE selects the cells with highest RSRP values and includes the available RSRP, RSRQ and SINR measurement quantities associated with these cells.

In some embodiments, only the RS type considered in the sorting is part of the list of RRM measurements created. In other embodiments, although the RS type considered in the sorting can be one RS type, all other available RS types are included in the list of sorted measurements. For example, for a selected {CSI-RS, RSRP} tuple, the UE can order cells based on the CSI-RS RSRP measurements but includes CSI-RS RSRP measurements as well as any SSB RSRP measurements associated with the neighbor cells.

Note that these embodiments could also be combined in various ways. For example, for a selected {CSI-RS, RSRP} tuple, the UE can order cells based on the CSI-RS RSRP measurements but includes the CSI-RS RSRP/RSRQ/SINR measurements and the SSB RSRP/RSRQ/SINR measurements associated with these cells.

In operation 1206, which is optional, the UE determines if all available {RS type, measurement quantity} tuples have been selected for sorting measurements of the selected frequency. If not, the UE returns to block 1202 for selection of an available (but previously unselected) {RS type, measurement quantity} tuple. Otherwise, the UE proceeds to operation 1207.

In operation 1207, the UE determines if all available frequencies have been selected for sorting (i.e., have all frequencies configured and with measurements been sorted). If not, the UE returns to block 1201 for selection of an available (but previously unselected) frequency.

Otherwise, the procedure ends.

In a second group of embodiments, the UE can sort available RRM measurements across all frequencies for which an RRM measurement is available, using one or more measurement quantities (e.g., RSRP, RSRQ, SINR, etc.) as sorting criteria. The one or more criteria can be selected from the available measurement quantities configured by the network.

In some of these embodiments, the UE can sort the available RRM measurements per reference signal type according to the following priority of sorting criteria: 1) based on RSRP, if RSRP is available; 2) otherwise based on RSRQ, if RSRQ is available; 3) otherwise based on SINR, if SINR is available; 4) otherwise based on some default criterion.

In other of these embodiments, the UE can create a list of sorted RRM measurements per {RS-type, measurement quantity} tuple. For example, if there are three (3) measurement quantities and two (2) RS types, the UE can create six (6) lists sorted across all frequencies. In some embodiments, the network can limit the number of RS-types and measurement quantities used for sorting algorithms (e.g., via RRC configuration of the UE). In some embodiments, a UE can limit the RS-types and measurement quantities used as sorting criteria, based on a policy and/or priority defined by the network or pre-configured in the UE. However, even though a subset of available RS types and/or measurement quantities are used for sorting, the UE can include in the RLF report values of other measurement quantities and/or RS types (i.e., those not used for sorting) for each neighbor cell that was measured.

FIG. 13 shows a flow diagram of an exemplary method (e.g., procedure) for sorting neighboring cell measurements into a list (e.g., a measResultNeighCells IE) according to the second group of embodiments. The exemplary method shown in FIG. 13 can be performed by a user equipment (e.g., UE, wireless device, MTC device, NB-IoT device, modem, etc. or component thereof). Although FIG. 13 shows specific blocks in a particular order, the operations of the exemplary method can be performed in a different order than shown and can be combined and/or divided into blocks having different functionality than shown. Optional blocks or operations are indicated by dashed lines.

In operation 1301, the UE selects a RS type (e.g., CSI-RS, SSB, etc.) from among the available RS types having RRM measurements (e.g., the RS set configured via RRC IE MeasObjectNR). In one embodiment, the UE select each available RS type in turn. In another embodiment, the UE can select RS types in a particular order, e.g., according to a priority and/or policy configured by the network or pre-configured in the UE. As an example, such a policy could exclude certain RS for sorting selection in operation 1301 (i.e., these RS would not be available).

In operation 1302, the UE selects a measurement quantity from the available measurement quantities (e.g., the measurements quantities configured via RRC IE MeasObjectNR, such as RSRP, RSRQ, SINR, etc.) as a sorting criterion. The UE's selection can be further based on whether the selected measurement quantities are available (e.g., have been measured) for the selected RS type (e.g., in 1301). For example, a policy (e.g., configured by the network or pre-configured in the UE) could exclude certain measurement quantities for selection as sorting criteria in operation 1302 (i.e., these measurement quantities would not be available).

In some embodiments, the measurement quantity can be selected in operation 1302 according to a priority order configured by the network and/or pre-configured in the UE. For example, the selected measurement quantity can be: 1) RSRP if available for selected frequency and RS type; 2) otherwise RSRQ if available; 3) otherwise SINR if available; 4) otherwise some default criterion. In other embodiments, the UE can select multiple measurement quantities as sorting criteria, which can be used to generate respective sorted lists (as discussed below).

In operation 1303, the UE sorts the RRM measurements across all available frequencies based on the currently selected {RS-type, measurement quantity} tuple. Sorting algorithms can include linear sorting algorithm, quick sorting, etc. In some embodiments, the UE can sort the available RRM measurements with equal values ("ties") based on a secondary sorting criterion, e.g., chosen from available measurement quantities. In cases where the UE selected multiple measurement quantities as sorting criteria, in operation 1303 the UE can generate a sorted list based on each sorting criterion.

In operation 1304, the UE creates (e.g., compiles) a list of sorted measurements across all frequencies for the currently selected {RS-type, measurement quantity} tuple. In case the UE generated multiple sorted lists in operation 1303 based on different sorting criteria, the UE can create lists for each sorting criterion used.

In some embodiments, when multiple measurement quantities exist for the selected RS type (e.g., the UE has measured by RSRP and RSRQ), the UE may create/compile multiple lists of the sorted measurements for each {RS-type, measurement quantity} tuple (e.g., {SSB, RSRP}, {CSI-RS, RSRQ}, {SSB, SINR}, etc.).

In some embodiments, the UE can include only the measurement quantity selected as the sorting criterion in the list of RRM measurements. In other embodiments, although the sorting criterion can be one measurement quantity, all the available other measurement quantities are also included in the list of sorted measurements. For example, when RSRP is used as the sorting criterion, the UE selects the cells with highest RSRP values and includes the available RSRP, RSRQ and SINR measurement quantities associated with these cells.

In some embodiments, only the RS type considered in the sorting is part of the list of RRM measurements created. In other embodiments, although the RS type considered in the sorting can be one RS type, all other available RS types are included in the list of sorted measurements. For example, for a selected {CSI-RS, RSRP} tuple, the UE can order cells based on the CSI-RS RSRP measurements but includes CSI-RS RSRP measurements as well as any SSB RSRP measurements associated with the neighbor cells.

Note that these embodiments could also be combined in various ways. For example, for a selected {CSI-RS, RSRP} tuple, the UE can order cells based on the CSI-RS RSRP measurements but includes the CSI-RS RSRP/RSRQ/SINR measurements and the SSB RSRP/RSRQ/SINR measurements associated with these cells.

In operation 1305, which is optional, the UE determines if all available {RS type, measurement quantity} tuples have been selected for sorting. If not, the UE returns to block 1301 for selection of an available (but previously unselected) {RS type, measurement quantity} tuple. Otherwise, the procedure ends.

Figure 14:
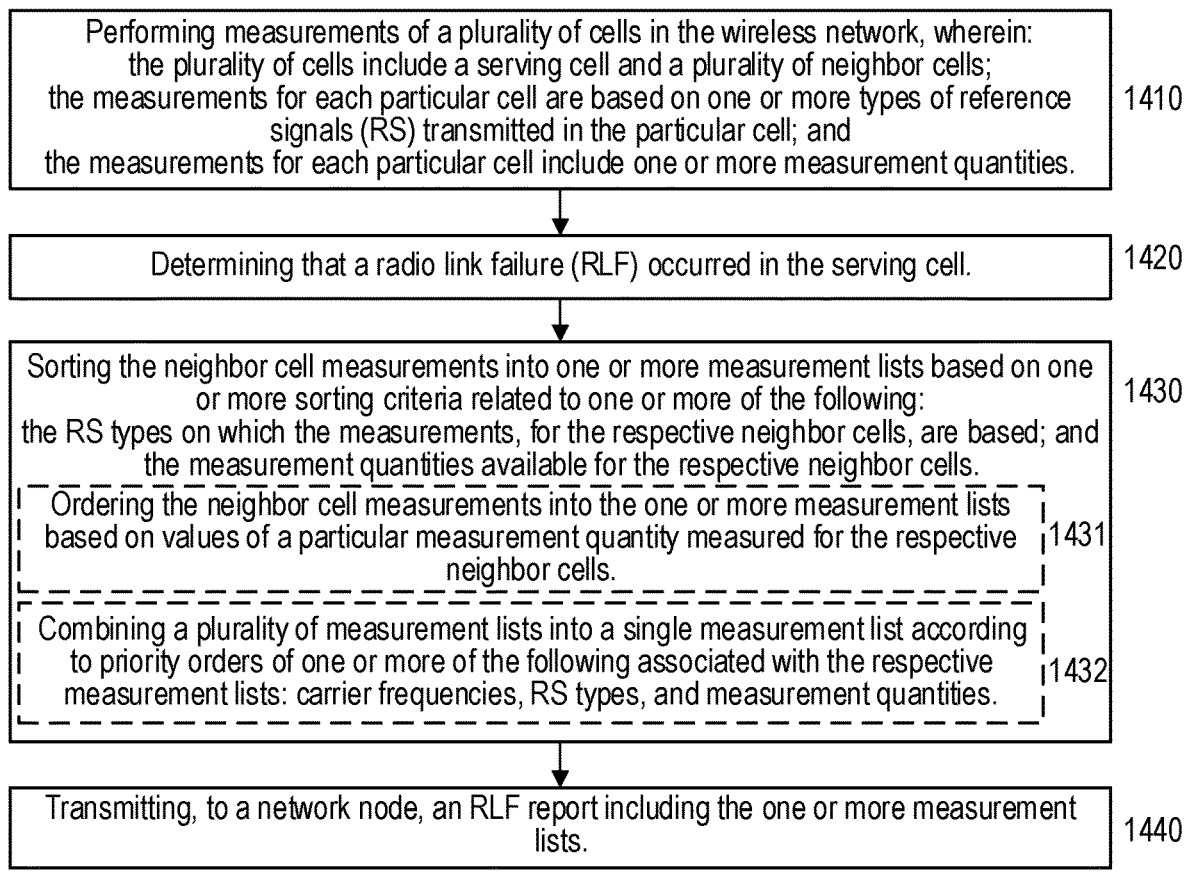
FIG. 14 shows a flow diagram of an exemplary method (e.g., procedure) for a user equipment (UE, e.g., wireless device, MTC device, NB-IoT device, modem, etc. or component thereof), according to various exemplary embodiments of the present disclosure.

Embodiments described above are further illustrated by FIG. 14, which shows a flow diagram of an exemplary method (e.g., procedure) for reporting radio link failure (RLF) in a cell of a wireless network, according to various exemplary embodiments of the present disclosure. In particular, aspects of the various embodiments discussed above are features of operations shown in FIG. 14. The exemplary method shown in FIG. 14 can be performed by a user equipment (UE, e.g., wireless device, MTC device, NB-IoT device, modem, etc. or component thereof) operating in a wireless network (e.g., E-UTRAN, NG-RAN, etc.) comprising a plurality of cells. Furthermore, the exemplary method shown in FIG. 14 can be used cooperatively with other exemplary methods described herein (e.g., FIGS. 12-13) to provide various exemplary benefits described herein. Although FIG. 14 shows specific blocks in a particular order, the operations of the exemplary method can be performed in a different order than shown and can be combined and/or divided into blocks having different functionality than shown. Optional blocks or operations are indicated by dashed lines.

The exemplary method can include the operations of block 1410, in which the UE can perform measurements of a plurality of cells in the wireless network. The plurality of cells can include a serving cell (i.e., for the UE) and a plurality of neighbor cells. The measurements for each particular cell (e.g., of the plurality) are based on one or more types of reference signals (RS) transmitted in the particular cell. For example, the types of RS can include any of the following: cell-specific RS (CRS), channel state information RS (CSI-RS), and synchronization/PBCH signal block (SSB). In addition, the measurements performed by the UE on each cell can include one or more measurement quantities. For example, the one or more measurement quantities can include any of the following: reference signal received power (RSRP), reference signal received quality (RSRQ), and signal-to-inference-and-noise ratio (SINR).

The exemplary method can also include the operations of block 1420, in which the UE can determine that a radio link failure (RLF) occurred in the serving cell. This determination can be performed cooperatively between the UE's L1 (or PHY) and RRC layer, as discussed above.

The exemplary method can also include the operations of block 1430, in which the UE can sort the neighbor cell measurements into one or more measurement lists based on one or more sorting criteria. The sorting criteria can be related to one or more of the following: the RS types on which the measurements, for the respective neighbor cells, are based; and the measurement quantities available for the respective neighbor cells. The exemplary method can also include the operations of block 1440, in which the UE can transmit, to a network node, an RLF report including the one or more measurement lists (e.g., sorted as in block 1430). For example, the UE can transmit such a report after it has reestablished its connection in a target cell after the RLF.

In some embodiments, the sorting criteria can include a particular measurement quantity (e.g., RSRP, RSRQ, or SINR). In such embodiments, the sorting operations of block 1430 can include the operations of sub-block 1431, where the UE can order the neighbor cell measurements into the one or more measurement lists based on values of the particular measurement quantity measured for the respective neighbor cells.

In some of these embodiments, the sorting criteria can include a plurality of measurement quantities and the one or more measurements lists can include a plurality of measurement lists associated with the respective measurement quantities. In such embodiments, the neighbor cell measurements that include the respective measurement quantities can be ordered (e.g., in sub-block 1431) into the respective measurement lists.

In other of these embodiments, the sorting criteria can also include a particular RS type (e.g., SSB). In such embodiments, ordering the neighbor cell measurements into the one or more measurement lists (e.g., in sub-block 1431) can be based on values of the particular measurement quantity measured for the respective neighbor cells based on the particular RS type. For example, when values of the particular measurement quantity (e.g., RSRP) are equal for two of the neighbor cells, ordering the measurements for the two neighbor cells (e.g., in sub-block 1431) can be based on values of one of the following measured for the two neighbor cells:
  a further measurement quantity (e.g., RSRQ) based on the particular RS type (e.g., SSB); or
  the particular measurement quantity (e.g., RSRP) based on a further RS type (e.g., CRS).

In other of these embodiments, the sorting criteria can also include a plurality of RS types and the one or more measurements lists include a plurality of measurement lists associated with the respective plurality of RS types. In such embodiments, ordering the neighbor cell measurements into the one or more measurement lists (e.g., in sub-block 1431)

can be based on values of the particular measurement quantity measured for the respective neighbor cells based on the respective RS types.

In some embodiments, the neighbor cell measurements can be performed (e.g., in block 1410) on a plurality of carrier frequencies. In some of these embodiments, the one or more measurements lists include a plurality of measurement lists associated with the respective plurality of carrier frequencies, and the neighbor cell measurements made on the respective carrier frequencies are ordered (e.g., in block 1431) into the respective measurement lists (e.g., as illustrated in FIG. 12).

In other of these embodiments, the one or more measurement lists are associated with the plurality of carrier frequencies, such that neighbor cell measurements made (e.g., in block 1410) on all of the carrier frequencies are ordered (e.g., in sub-block 1431) into the one or more measurement lists (e.g., as illustrated in FIG. 13). In some of these embodiments, the one or more measurements lists include a plurality of measurement lists associated with a respective plurality of RS types and with all of the carrier frequencies. In such embodiments, the neighbor cell measurements made (e.g., in block 1410) on the respective RS types are ordered (e.g., in sub-block 1431) into the respective measurement lists.

In some embodiments, the one or more measurements lists can include a plurality of measurement lists. In such embodiments, the sorting operations in block 1430 can include the operations of sub-block 1432, where the UE can combine the plurality of measurement lists into a single measurement list according to priority orders of one or more of the following associated with the respective measurement lists: carrier frequencies, RS types, and measurement quantities. In such embodiments, the RLF report (e.g., transmitted in block 1440) includes the single measurement list.

In various embodiments, the one or more measurement lists (e.g., included in the RLF report) can include one of the following types of measurement values:
- values of a particular measurement quantity, used as a sorting criterion, that are based on a particular RS type, also used as a sorting criterion;
- values of a particular measurement quantity, used as a sorting criterion, that are based on any of the RS types;
- values of any available measurement quantities that are based on a particular RS type used as a sorting criterion; or
- values of any available measurement quantities that are based on any of the RS types.

For example, the UE can selectively include measurement values other than the {RS type, measurement quantity} tuple used for sorting, as discussed above.

To the extent that any of the features of the sorting techniques of FIGS. 12-13 discussed above are not explicitly disclosed as being part of the operations shown in FIG. 14, skilled persons will recognize that such features can be incorporated in the sorting operation of block 1430 (e.g., as sub-blocks) and/or other blocks.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 15:
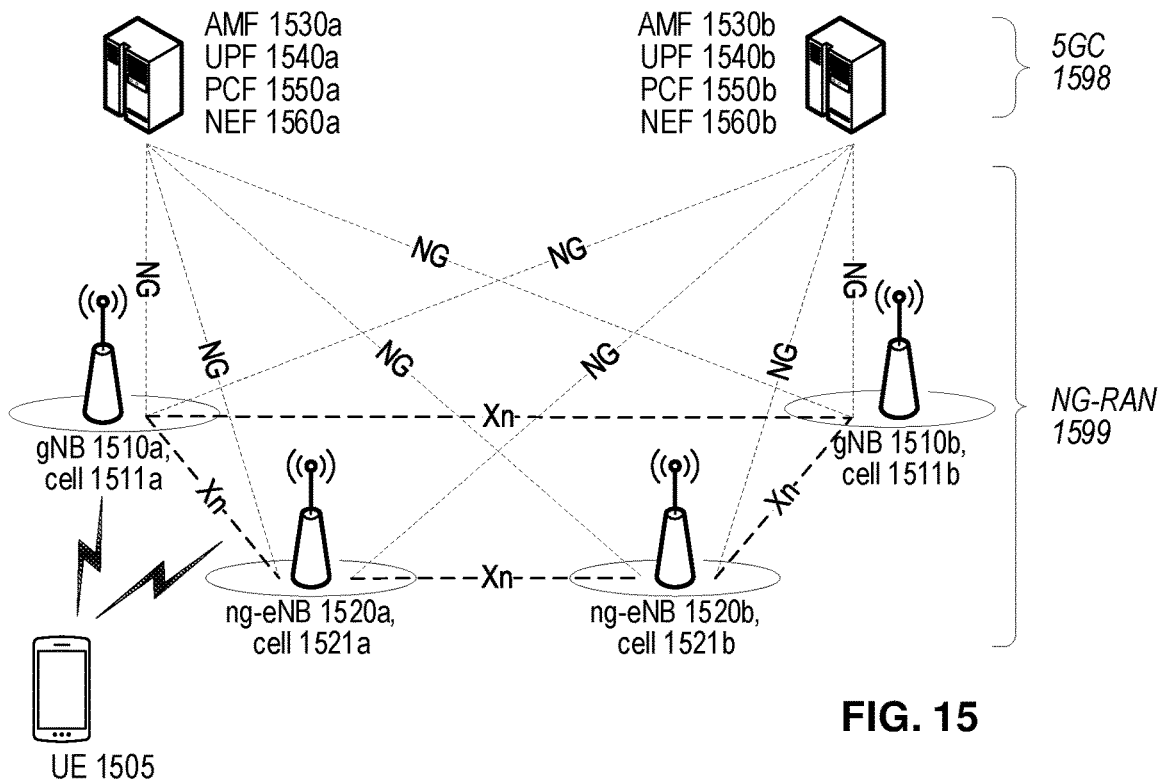
FIG. 15 shows a high-level view of an exemplary 5G network architecture.

FIG. 15 shows a high-level view of an exemplary 5G network architecture, including a Next Generation Radio Access Network (NG-RAN) 1599 and a 5G Core (5GC) 1598. As shown in the figure, NG-RAN 1599 can include gNBs 1510 (e.g., 1510*a,b*) and ng-eNBs 1520 (e.g., 1520*a,b*) that are interconnected with each other via respective Xn interfaces. The gNBs and ng-eNBs are also connected via the NG interfaces to 5GC 1598, more specifically to the AMF (Access and Mobility Management Function) 1530 (e.g., AMFs 1530*a,b*) via respective NG-C interfaces and to the UPF (User Plane Function) 1540 (e.g., UPFs 1540*a,b*) via respective NG-U interfaces. Moreover, the AMFs 1530*a,b* can communicate with one or more policy control functions (PCFs, e.g., PCFs 1550*a,b*) and network exposure functions (NEFs, e.g., NEFs 1560*a,b*).

Each of the gNBs 1510 can support the NR radio interface including frequency division duplexing (FDD), time division duplexing (TDD), or a combination thereof. In contrast, each of ng-eNBs 1520 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 1511*a-b* and 1521*a-b* shown as exemplary in FIG. 15. As mentioned above, the gNBs and ng-eNBs can also use various directional beams to provide coverage in the respective cells. Depending on the particular cell in which it is located, a UE 1505 can communicate with the gNB or ng-eNB serving that particular cell via the NR or LTE radio interface, respectively.

Each of gNBs 1510*a,b* can include a central (or centralized) unit (CU or gNB-CU) and one or more distributed (or decentralized) units (DU or gNB-DU). CUs are logical nodes that host higher-layer protocols and perform various gNB functions such controlling the operation of DUs. Likewise, DUs are logical nodes that hosts lower-layer protocols and can include various subsets of the gNB functions, depending on the functional split. As such, each of the CUs and DUs can include various circuitry needed to perform their respective functions, including processing circuitry, transceiver circuitry (e.g., for communication), and power supply circuitry. A gNB-CU connects to its gNB-DUs over respective F1 logical interfaces, but a gNB-CU and connected gNB-DUs are only visible to other gNBs and the 5GC as a gNB. In other words, the F1 interface is not visible beyond a gNB-CU.

Figure 16:
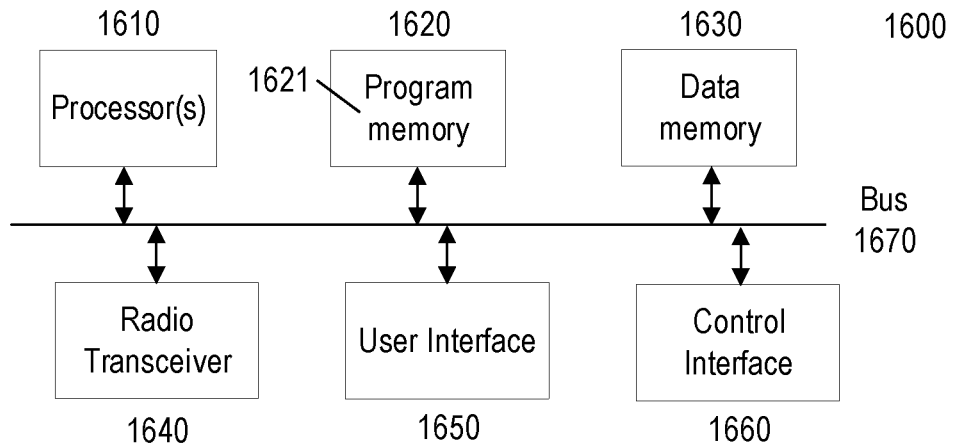
FIG. 16 shows a block diagram of an exemplary wireless device or UE, according to various exemplary embodiments of the present disclosure.

FIG. 16 shows a block diagram of an exemplary wireless device or user equipment (UE) 1600 (hereinafter referred to as "UE 1600") according to various embodiments of the present disclosure, including those described above with reference to other figures. For example, UE 1600 can be configured by execution of instructions, stored on a computer-readable medium, to perform operations corresponding to one or more of the exemplary methods and/or procedures described above.

UE 1600 can include a processor 1610 (also referred to as "processing circuitry") that can be operably connected to a program memory 1620 and/or a data memory 1630 via a bus 1670 that can comprise parallel address and data buses, serial ports, or other methods and/or structures known to those of ordinary skill in the art. Program memory 1620 can store software code, programs, and/or instructions (collectively shown as computer program product 1621 in FIG. 16) that, when executed by processor 1610, can configure and/or facilitate UE 1600 to perform various operations, including operations described below. For example, execution of such instructions can configure and/or facilitate UE 1600 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1640, user interface 1650, and/or control interface 1660.

As another example, processor 1610 can execute program code stored in program memory 1620 that corresponds to MAC, RLC, PDCP, and RRC layer protocols standardized by 3GPP (e.g., for NR and/or LTE). As a further example, processor 1610 can execute program code stored in program memory 1620 that, together with radio transceiver 1640, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1610 can execute program code stored in program memory 1620 that, together with radio transceiver 1640, implements device-to-device (D2D) communications with other compatible devices and/or UEs.

Program memory 1620 can also include software code executed by processor 1610 to control the functions of UE 1600, including configuring and controlling various components such as radio transceiver 1640, user interface 1650, and/or host interface 1660. Program memory 1620 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1620 can comprise an external storage arrangement (not shown) remote from UE 1600, from which the instructions can be downloaded into program memory 1620 located within or removably coupled to UE 1600, so as to enable execution of such instructions.

Data memory 1630 can include memory area for processor 1610 to store variables used in protocols, configuration, control, and other functions of UE 1600, including operations corresponding to, or comprising, any of the exemplary methods and/or procedures described herein. Moreover, program memory 1620 and/or data memory 1630 can include non-volatile memory (e.g., flash memory), volatile memory (e.g., static or dynamic RAM), or a combination thereof. Furthermore, data memory 1630 can comprise a memory slot by which removable memory cards in one or more formats (e.g., SD Card, Memory Stick, Compact Flash, etc.) can be inserted and removed.

Persons of ordinary skill will recognize that processor 1610 can include multiple individual processors (including, e.g., multi-core processors), each of which implements a portion of the functionality described above. In such cases, multiple individual processors can be commonly connected to program memory 1620 and data memory 1630 or individually connected to multiple individual program memories and or data memories. More generally, persons of ordinary skill in the art will recognize that various protocols and other functions of UE 1600 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1640 can include radio-frequency transmitter and/or receiver functionality that facilitates the UE 1600 to communicate with other equipment supporting like wireless communication standards and/or protocols. In some exemplary embodiments, the radio transceiver 1640 includes one or more transmitters and one or more receivers that enable UE 1600 to communicate according to various protocols and/or methods proposed for standardization by 3GPP and/or other standards bodies. For example, such functionality can operate cooperatively with processor 1610 to implement a PHY layer based on OFDM, OFDMA, and/or SC-FDMA technologies, such as described herein with respect to other figures.

In some exemplary embodiments, radio transceiver 1640 includes one or more transmitters and one or more receivers that can facilitate the UE 1600 to communicate with various LTE, LTE-Advanced (LTE-A), and/or NR networks according to standards promulgated by 3GPP. In some exemplary embodiments of the present disclosure, the radio transceiver 1640 includes circuitry, firmware, etc. necessary for the UE 1600 to communicate with various NR, NR-U, LTE, LTE-A, LTE-LAA, UMTS, and/or GSM/EDGE networks, also according to 3GPP standards. In some embodiments, radio transceiver 1640 can include circuitry supporting D2D communications between UE 1600 and other compatible devices.

In some embodiments, radio transceiver 1640 includes circuitry, firmware, etc. necessary for the UE 1600 to communicate with various CDMA2000 networks, according to 3GPP2 standards. In some embodiments, the radio transceiver 1640 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1640 can include a transceiver that is capable of wired communication, such as by using IEEE 802.3 Ethernet technology. The functionality particular to each of these embodiments can be coupled with and/or controlled by other circuitry in the UE 1600, such as the processor 1610 executing program code stored in program memory 1620 in conjunction with, and/or supported by, data memory 1630.

User interface 1650 can take various forms depending on the particular embodiment of UE 1600, or can be absent from UE 1600 entirely. In some embodiments, user interface 1650 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1600 can comprise a tablet computing device including a larger touchscreen display. In such embodiments, one or more of the mechanical features of the user interface 1650 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1600 can be a digital computing device, such as a laptop computer, desktop computer, workstation, etc. that comprises a mechanical keyboard that can be integrated, detached, or detachable depending on the particular exemplary embodiment.

Such a digital computing device can also comprise a touch screen display. Many exemplary embodiments of the UE 1600 having a touch screen display are capable of receiving user inputs, such as inputs related to exemplary methods and/or procedures described herein or otherwise known to persons of ordinary skill in the art.

In some embodiments, UE 1600 can include an orientation sensor, which can be used in various ways by features and functions of UE 1600. For example, the UE 1600 can use outputs of the orientation sensor to determine when a user has changed the physical orientation of the UE 1600's touch screen display. An indication signal from the orientation sensor can be available to any application program executing on the UE 1600, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1660 of the UE 1600 can take various forms depending on the particular exemplary embodiment of UE 1600 and of the particular interface requirements of other devices that the UE 1600 is intended to communicate with and/or control. For example, the control interface 1660 can comprise an RS-232 interface, a USB interface, an HDMI interface, a Bluetooth interface, an IEEE ("Firewire") interface, an I$^2$C interface, a PCMCIA interface, or the like. In some exemplary embodiments of the present disclosure, control interface 1660 can comprise an IEEE 802.3 Ethernet interface such as described above. In some exemplary embodiments of the present disclosure, the control interface 1660 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 1600 can comprise more functionality than is shown in FIG. 16 including, for example, a video and/or still-image camera, microphone, media player and/or recorder, etc. Moreover, radio transceiver 1640 can include circuitry necessary to communicate using additional radio-frequency communication standards including Bluetooth, GPS, and/or others. Moreover, the processor 1610 can execute software code stored in the program memory 1620 to control such additional functionality. For example, directional velocity and/or position estimates output from a GPS receiver can be available to any application program executing on the UE 1600, including various exemplary methods and/or computer-readable media according to various exemplary embodiments of the present disclosure.

Figure 17:
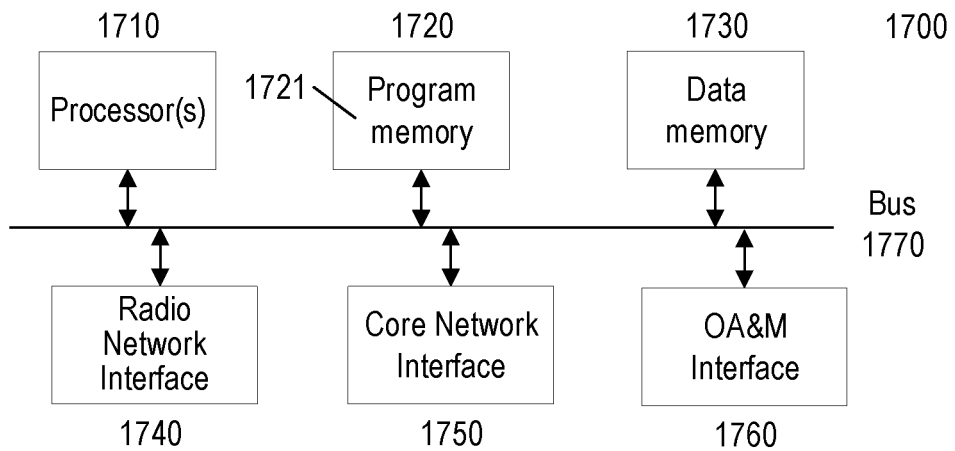
FIG. 17 shows a block diagram of an exemplary network node, according to various exemplary embodiments of the present disclosure.

FIG. 17 shows a block diagram of an exemplary network node 1700 according to various embodiments of the present disclosure, including those described above with reference to other figures. For example, exemplary network node 1700 can be configured by execution of instructions, stored on a computer-readable medium, to perform operations corresponding to one or more of the exemplary methods and/or procedures described above. In some exemplary embodiments, network node 1700 can comprise a base station, eNB, gNB, or one or more components thereof. For example, network node 1700 can be configured as a central unit (CU) and one or more distributed units (DUs) according to NR gNB architectures specified by 3GPP. More generally, the functionally of network node 1700 can be distributed across various physical devices and/or functional units, modules, etc.

Network node 1700 can include processor 1710 (also referred to as "processing circuitry") that is operably connected to program memory 1720 and data memory 1730 via bus 1770, which can include parallel address and data buses, serial ports, or other methods and/or structures known to those of ordinary skill in the art.

Program memory 1720 can store software code, programs, and/or instructions (collectively shown as computer program product 1721 in FIG. 17) that, when executed by processor 1710, can configure and/or facilitate network node 1700 to perform various operations. For example, execution of such stored instructions can configure network node 1700 to communicate with one or more other devices using protocols according to various embodiments of the present disclosure, including one or more exemplary methods and/or procedures discussed above. Program memory 1720 can also comprise software code executed by processor 1710 that can facilitate and specifically configure network node 1700 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1740 and core network interface 1750. By way of example and without limitation, core network interface 1750 can comprise the S1 interface and radio network interface 1740 can comprise the Uu interface, as standardized by 3GPP. Program memory 1720 can further comprise software code executed by processor 1710 to control the functions of network node 1700, including configuring and controlling various components such as radio network interface 1740 and core network interface 1750.

Data memory 1730 can comprise memory area for processor 1710 to store variables used in protocols, configuration, control, and other functions of network node 1700. As such, program memory 1720 and data memory 1730 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1710 can include multiple individual processors (not shown), each of which implements a portion of the functionality described above. In such case, multiple individual processors may be commonly connected to program memory 1720 and data memory 1730 or individually connected to multiple individual program memories and/or data memories. More generally, persons of ordinary skill will recognize that various protocols and other functions of network node 1700 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1740 can comprise transmitters, receivers, signal processors, ASICs, antennas, beamforming units, and other circuitry that enables network node 1700 to communicate with other equipment such as, in some embodiments, a plurality of compatible user equipment (UE). In some embodiments, interface 1740 can also enable network node 1700 to communicate with compatible satellites of a satellite communication network. In some exemplary embodiments, radio network interface 1740 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1740. According to further exemplary embodiments of the present disclosure, the radio network interface 1740 can comprise a PHY layer based on OFDM, OFDMA, and/or SC-FDMA technologies. In some embodiments, the functionality of such a PHY layer can be provided cooperatively by radio network interface 1740 and processor 1710 (including program code in memory 1720).

Core network interface 1750 can comprise transmitters, receivers, and other circuitry that enables network node 1700 to communicate with other equipment in a core network such as, in some embodiments, circuit-switched (CS) and/or packet-switched Core (PS) networks. In some embodiments, core network interface 1750 can comprise the S1 interface standardized by 3GPP. In some embodiments, core network interface 1750 can comprise the NG interface standardized by 3GPP. In some exemplary embodiments, core network interface 1750 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1750 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1700 can include hardware and/or software that configures and/or facilitates network node 1700 to communicate with other network nodes in a RAN, such as with other eNBs, gNBs, ng-eNBs, en-gNBs, IAB nodes, etc. Such hardware and/or software can be part of radio network interface 1740 and/or core network interface 1750, or it can be a separate functional unit (not shown). For example, such hardware and/or software can configure and/or facilitate network node 1700 to communicate with other RAN nodes via the X2 or Xn interfaces, as standardized by 3GPP.

OA&M interface 1760 can comprise transmitters, receivers, and other circuitry that enables network node 1700 to communicate with external networks, computers, databases, and the like for purposes of operations, administration, and maintenance of network node 1700 or other network equipment operably connected thereto. Lower layers of OA&M interface 1760 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1740, core network interface 1750, and OA&M interface 1760 may be multiplexed together on a single physical interface, such as the examples listed above.

Figure 18:
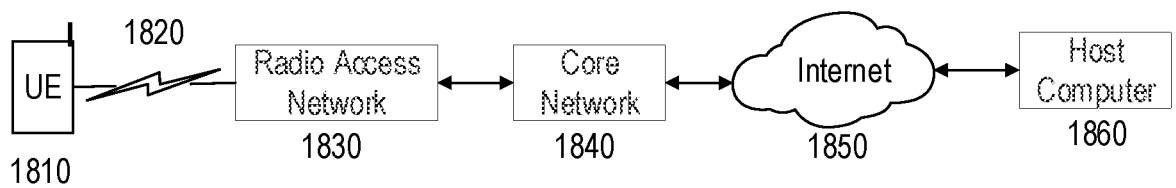
FIG. 18 shows a block diagram of an exemplary network configured to provide over-the-top (OTT) data services between a host computer and a UE, according to various exemplary embodiments of the present disclosure.

FIG. 18 is a block diagram of an exemplary communication network configured to provide over-the-top (OTT) data services between a host computer and a user equipment (UE), according to one or more exemplary embodiments of the present disclosure. UE 1810 can communicate with radio access network (RAN) 1830 over radio interface 1820, which can be based on protocols described above including, e.g., LTE, LTE-A, and 5G/NR. For example, UE 1810 can be configured and/or arranged as shown in other figures discussed above.

RAN 1830 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1830 can cooperatively operate using licensed and unlicensed spectrum. In some embodiments, RAN 1830 can include, or be capable of communication with, one or more satellites comprising a satellite access network.

RAN 1830 can further communicate with core network 1840 according to various protocols and interfaces described above. For example, one or more apparatus (e.g., base stations, eNBs, gNBs, etc.) comprising RAN 1830 can communicate to core network 1840 via core network interface 1650 described above. In some exemplary embodiments, RAN 1830 and core network 1840 can be configured and/or arranged as shown in other figures discussed above. For example, eNBs comprising an E-UTRAN 1830 can communicate with an EPC core network 1840 via an S1 interface, such as shown in FIG. 1. As another example, gNBs comprising a NR RAN 1830 can communicate with a 5GC core network 1830 via an NG interface.

Core network 1840 can further communicate with an external packet data network, illustrated in FIG. 18 as Internet 1850, according to various protocols and interfaces known to persons of ordinary skill in the art. Many other devices and/or networks can also connect to and communicate via Internet 1850, such as exemplary host computer 1860. In some exemplary embodiments, host computer 1860 can communicate with UE 1810 using Internet 1850, core network 1840, and RAN 1830 as intermediaries. Host computer 1860 can be a server (e.g., an application server) under ownership and/or control of a service provider. Host computer 1860 can be operated by the OTT service provider or by another entity on the service provider's behalf.

For example, host computer 1860 can provide an over-the-top (OTT) packet data service to UE 1810 using facilities of core network 1840 and RAN 1830, which can be unaware of the routing of an outgoing/incoming communication to/from host computer 1860. Similarly, host computer 1860 can be unaware of routing of a transmission from the host computer to the UE, e.g., the routing of the transmission through RAN 1830. Various OTT services can be provided using the exemplary configuration shown in FIG. 18 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 18 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient and unambiguous techniques for reporting neighbor cell measurements made by a UE prior to a radio link failure (RLF). By relying on clear and deterministic sorting rules, such techniques can reduce and/or eliminate ambiguities in interpreting such RLF reports by the network. Consequently, such techniques can improve a network's ability to perform remedial actions for cells in which the reported RLF occurs, which can reduce and/or eliminate subsequent RLF failures in such cells.

When used in LTE or NR UEs (e.g., UE 1810) and eNBs or gNBs (e.g., gNBs comprising RAN 1830), exemplary embodiments described herein can provide various improvements, benefits, and/or advantages to OTT service providers and end-users, including more consistent data throughput and fewer delays without excessive UE power consumption, service interruptions, and/or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

E1. A method, performed by a user equipment (UE), of reporting radio link failure (RLF) in a cell of a wireless network, the method comprising:
  performing measurements of a plurality of cells in the wireless network, wherein:
    the plurality of cells include a serving cell and a plurality of neighbor cells;
    the measurements for each particular cell are based on one or more types of reference signals (RS) transmitted in the particular cell; and
    the measurements for each cell include one or more measurement quantities;
  determining that a radio link failure (RLF) occurred in the serving cell;
  sorting the neighbor cell measurements into one or more measurement lists based on one or more sorting criteria related to one or more of the following:
    the RS types on which the measurements, for the respective neighbor cells, are based; and
    the measurement quantities available for the respective neighbor cells;
  transmitting, to a node in the wireless network via a target cell, a RLF report comprising the one or more measurement lists.

E2. The method of embodiment E1, wherein the measurements for each neighbor cell include measurements made on a plurality of different carrier frequencies.

E3. The method of embodiment E2, herein each measurement list includes only measurements for a single carrier frequency.

E4. The method of embodiment E2, wherein each measurement list includes measurements for the plurality of different carrier frequencies.

E5. The method of any of embodiments E1-E4, wherein:
the sorting criteria include a particular measurement quantity; and
sorting the neighbor cell measurements includes ordering the neighbor cell measurements based on values of the particular measurement quantity measured for the respective neighbor cells.

E6. The method of embodiment E5, wherein:
the sorting criteria also include a particular RS type; and
sorting the neighbor cell measurements includes ordering the neighbor cell measurements based on values of the particular measurement quantity measured for the respective neighbor cells based on the particular RS type.

E7. The method of any of embodiments E1-E6, wherein the one of more measurement lists include one of the following:
values of the particular measurement quantity that are based on the particular RS type;
values of the particular measurement quantity that are based on any of the RS types;
values of any of the measurement quantities that are based on the particular RS type; or
values of any of the measurement quantities that are based on any of the RS types.

E8. The method of any of embodiments E1-E7, wherein the one or more RS types include any of the following:
cell-specific RS (CRS);
channel state information RS (CSI-RS); and
synchronization/PBCH signal block (SSB).

E9. The method of any of embodiments E1-E8, wherein the one or more measurement quantities include any of the following:
reference signal received power (RSRP);
reference signal received quality (RSRQ); and
signal-to-inference-and-noise ratio (SINR).

E10. A user equipment (UE) configured to report radio link failure (RLF) in a cell of a wireless network, the UE comprising:
transceiver circuitry configured to communicate with one or more network nodes in the wireless network; and
processing circuitry operatively coupled to the transceiver circuitry, whereby the processing circuitry and the transceiver circuitry are configured to perform operations corresponding to any of the methods of embodiments E1-E9.

E11. A user equipment (UE) configured to report radio link failure (RLF) in a cell of a wireless network, the UE being further arranged to perform operations corresponding to any of the methods of embodiments E1-E9.

E12. A non-transitory, computer-readable medium storing computer-executable instructions that, when executed by processing circuitry of a user equipment (UE), configure the UE to perform operations corresponding to any of the methods of embodiments E1-E9.

E13. A computer program product comprising computer-executable instructions that, when executed by processing circuitry of a user equipment (UE), configure the UE to perform operations corresponding to any of the methods of embodiments E1-E9.

The invention claimed is:

1. A method, performed by a user equipment, UE, for reporting radio link failure, RLF, in a cell of a wireless network, the method comprising:
performing measurements of a plurality of cells in the wireless network, wherein:
the plurality of cells include a serving cell and a plurality of neighbor cells,
the measurements for each particular cell are based on one or more types of reference signals, RS, transmitted in the particular cell, and
the measurements for each particular cell include one or more measurement quantities;
determining that an RLF occurred in the serving cell;
sorting the neighbor cell measurements into one or more measurement lists based on one or more sorting criteria related to one or more of the following:
the RS types on which the measurements, for the respective neighbor cells, are based; and
the measurement quantities available for the respective neighbor cells;
transmitting, to a network node, an RLF report including the one or more measurement lists.

2. The method of claim 1, wherein the one or more RS types include any of the following:
cell-specific RS, CRS;
channel state information RS, CSI-RS; and
synchronization/PBCH signal block, SSB.

3. The method of claim 1, wherein the one or more measurement quantities include any of the following:
reference signal received power, RSRP;
reference signal received quality, RSRQ; and
signal-to-inference-and-noise ratio, SINR.

4. The method of claim 1, wherein:
the sorting criteria include a particular measurement quantity; and
sorting the neighbor cell measurements includes ordering the neighbor cell measurements into the one or more measurement lists based on values of the particular measurement quantity measured for the respective neighbor cells.

5. The method of claim 4, wherein:
the sorting criteria include a plurality of measurement quantities;
the one or more measurements lists include a plurality of measurement lists associated with the respective measurement quantities; and
the neighbor cell measurements that include the respective measurement quantities are ordered into the respective measurement lists.

6. The method of claim 4, wherein:
the sorting criteria also include a particular RS type; and
ordering the neighbor cell measurements into the one or more measurement lists is based on values of the particular measurement quantity measured for the respective neighbor cells based on the particular RS type.

7. The method of claim 6, wherein, when values of the particular measurement quantity are equal for two of the neighbor cells, ordering the measurements for the two neighbor cells is based on values of one of the following measured for the two neighbor cells:
a further measurement quantity based on the particular RS type; or
the particular measurement quantity based on a further RS type.

8. The method of claim 4, wherein:
the sorting criteria also include a plurality of RS types;
the one or more measurements lists include a plurality of measurement lists associated with the respective plurality of RS types; and
ordering the neighbor cell measurements into the one or more measurement lists is based on values of the particular measurement quantity measured for the respective neighbor cells based on the respective RS types.

9. The method of claim 4, wherein the neighbor cell measurements are performed on a plurality of carrier frequencies.

10. The method of claim 9, wherein:
the one or more measurements lists include a plurality of measurement lists associated with the respective plurality of carrier frequencies; and
the neighbor cell measurements made on the respective carrier frequencies are ordered into the respective measurement lists.

11. The method of claim 9, wherein:
the one or more measurement lists are associated with the plurality of carrier frequencies; and
neighbor cell measurements made on all of the carrier frequencies are ordered into the one or more measurement lists.

12. The method of claim 11, wherein:
the one or more measurements lists include a plurality of measurement lists associated with a respective plurality of RS types and with all of the carrier frequencies; and
the neighbor cell measurements made on the respective RS types are ordered into the respective measurement lists.

13. The method of claim 1, wherein:
the one or more measurements lists include a plurality of measurement lists;
sorting the neighbor cell measurements further comprises combining the plurality of measurement lists into a single measurement list according to priority orders of one or more of the following associated with the respective measurement lists: carrier frequencies, RS types, and measurement quantities; and
the RLF report includes the single measurement list.

14. The method of claim 1, wherein the one of more measurement lists include one of the following:
values of a particular measurement quantity, used as a sorting criterion, that are based on a particular RS type, also used as a sorting criterion;
values of a particular measurement quantity, used as a sorting criterion, that are based on any of the RS types;
values of any available measurement quantities that are based on a particular RS type used as a sorting criterion; or
values of any available measurement quantities that are based on any of the RS types.

15. A user equipment, UE configured to report radio link failure, RLF, in a cell of a wireless network, the UE comprising:
radio transceiver circuitry configured to communicate with one or more network nodes in the wireless network; and
processing circuitry operatively coupled to the radio transceiver circuitry, whereby the processing circuitry and the radio transceiver circuitry are configured to:
perform measurements of a plurality of cells in the wireless network, wherein:
the plurality of cells include a serving cell and a plurality of neighbor cells,
the measurements for each particular cell are based on one or more types of reference signals, RS, transmitted in the particular cell, and
the measurements for each particular cell include one or more measurement quantities;
determine that an RLF occurred in the serving cell;
sort the neighbor cell measurements into one or more measurement lists based on one or more sorting criteria related to one or more of the following:
the RS types on which the measurements, for the respective neighbor cells, are based; and
the measurement quantities available for the respective neighbor cells;
transmit, to a network node, an RLF report including the one or more measurement lists.

16. The user equipment of claim 15, wherein the one or more RS types include any of the following:
cell-specific RS, CRS;
channel state information RS, CSI-RS; and
synchronization/PBCH signal block, SSB.

17. The user equipment of claim 15, wherein the one or more measurement quantities include any of the following:
reference signal received power, RSRP;
reference signal received quality, RSRQ; and
signal-to-inference-and-noise ratio, SINR.

18. The user equipment of claim 15, wherein:
the sorting criteria include a particular measurement quantity; and
the processing circuitry and the radio transceiver circuitry configured to sort the neighbor cell measurements includes the processing circuitry and the radio transceiver circuitry configured to order the neighbor cell measurements into the one or more measurement lists based on values of the particular measurement quantity measured for the respective neighbor cells.

19. The user equipment of claim 18, wherein:
the sorting criteria include a plurality of measurement quantities;
the one or more measurements lists include a plurality of measurement lists associated with the respective measurement quantities; and
the neighbor cell measurements that include the respective measurement quantities are ordered into the respective measurement lists.

20. The user equipment of claim 18, wherein:
the sorting criteria also include a particular RS type; and
the processing circuitry and the radio transceiver circuitry are configured to order the neighbor cell measurements into the one or more measurement lists based on values of the particular measurement quantity measured for the respective neighbor cells based on the particular RS type.

* * * * *

UNITED STATES PATENT AND TRADEMARK OFFICE
CERTIFICATE OF CORRECTION

PATENT NO. : 12,207,076 B2
APPLICATION NO. : 17/772069
DATED : January 21, 2025
INVENTOR(S) : Ramachandra et al.

Page 1 of 1

It is certified that error appears in the above-identified patent and that said Letters Patent is hereby corrected as shown below:

In the Specification

In Column 1, Line 32, delete "ultra-low latency critical communications" and insert -- ultra reliable and low latency communications --, therefor.

In Column 4, Line 23, delete "$N_c$" and insert -- $N_{sc}$ --, therefor.

In Column 5, Line 6, delete "Sequence" and insert -- Signal --, therefor.

In Column 5, Line 7, delete "Sequence" and insert -- Signal --, therefor.

In Column 8, Line 14, delete "RACH-ConfgCommon" and insert -- RACH-ConfigCommon --, therefor.

In Column 12, Lines 41-42, delete "radioResourceConfgCommon;" and insert -- radioResourceConfigCommon; --, therefor.

In Column 12, Line 54, delete "rif-TimersAndConstants:" and insert -- rlf-TimersAndConstants: --, therefor.

In Column 18, Line 6, delete "measResultListEUTRA:" and insert -- measResultListEUTRA; --, therefor.

In the Claims

In Column 37, Line 44, in Claim 14, delete "one of more" and insert -- one or more --, therefor.

Signed and Sealed this
Sixteenth Day of September, 2025

Coke Morgan Stewart
*Acting Director of the United States Patent and Trademark Office*